United States Patent
Li et al.

[11] Patent Number: 6,108,025
[45] Date of Patent: Aug. 22, 2000

[54] OPTICAL SCANNER SYSTEM HAVING A LASER BEAM POWER ATTENTUATION MECHANISM

[75] Inventors: Yun Zhong Li, Woodbury; Paul C. Schubert, Marine-on-St. Corix, both of Minn.

[73] Assignee: Eastman Kodak Company, Rochester, N.Y.

[21] Appl. No.: 08/939,899

[22] Filed: Sep. 29, 1997

[51] Int. Cl.[7] ................................................ B41J 27/00
[52] U.S. Cl. .................... 347/256; 347/258; 347/241; 359/205; 359/212; 359/207
[58] Field of Search .................... 347/241, 256, 347/244, 258, 260; 355/67, 68, 71, 88, 117; 345/418; 356/218; 359/205, 207, 212

[56] References Cited

U.S. PATENT DOCUMENTS

| | | | |
|---|---|---|---|
| 3,584,369 | 6/1971 | De Montebello | 29/458 |
| 3,725,574 | 4/1973 | Gast | 358/298 |
| 3,750,189 | 7/1973 | Fleischer | 347/137 |
| 3,871,803 | 3/1975 | Beattie | 425/175 |
| 3,903,218 | 9/1975 | Humphrey | 264/1.7 |
| 3,917,766 | 11/1975 | Howden | 264/1.7 |
| 3,946,150 | 3/1976 | Grafton | 358/481 |
| 4,040,096 | 8/1977 | Starkweather | 358/302 |
| 4,383,755 | 5/1983 | Fedder et al. | 347/259 |
| 4,432,832 | 2/1984 | Fantone | 216/24 |
| 4,475,787 | 10/1984 | Starkweather | 359/211 |
| 4,496,209 | 1/1985 | Itoh et al. | 359/206 |
| 4,606,601 | 8/1986 | Starkweather | 359/211 |
| 4,625,315 | 11/1986 | Lemberger et al. | 372/38 |
| 4,750,045 | 6/1988 | Ohara et al. | 358/494 |
| 4,853,709 | 8/1989 | Stein et al. | 347/259 |
| 4,859,041 | 8/1989 | Suda | 359/676 |
| 4,936,643 | 6/1990 | Beiser | 359/212 |

(List continued on next page.)

FOREIGN PATENT DOCUMENTS

| | | |
|---|---|---|
| 0 216 562 | 4/1987 | European Pat. Off. . |
| 0 357 396 | 3/1990 | European Pat. Off. . |
| 0 366 039 | 5/1990 | European Pat. Off. . |
| 0 367 241 | 5/1990 | European Pat. Off. . |
| 0 476 698 | 3/1992 | European Pat. Off. . |
| 0 740 454 A2 | 10/1996 | European Pat. Off. . |
| 9 766 116 A2 | 4/1997 | European Pat. Off. . |
| 56-106203 | 8/1981 | Japan . |
| 03233423 | 10/1991 | Japan . |
| 09033834 | 2/1997 | Japan . |
| 09159951 | 6/1997 | Japan . |
| 2 207 773 | 2/1989 | United Kingdom . |
| 2 307 305 | 5/1997 | United Kingdom . |

OTHER PUBLICATIONS

Beiser, *Optical Scanners*, VHC Publishers, Inc., New York, NY, Copyright 1995, pp. 337–368.

Beiser, "Design Equations for a Polygon Laser Scanner", *Beam Deflection and Scanning Technologies*, vol. 1454, SPIE Proceedings Feb. 25–Mar. 1, 1991, SPIE Publishers, Bellingham, Washington, pp. 60–66.

Beiser, "Resolution of Laser Scanners", *Optical Engineering*, vol. 23, No. 3, May/Jun. 1984, pp. 266–268.

*Primary Examiner*—N. Le
*Assistant Examiner*—Hai C. Pham
*Attorney, Agent, or Firm*—William F. Noval

[57] ABSTRACT

An optical scanner assembly for exposing an image on a scanned surface. The optical scanner assembly includes a laser mechanism for producing a laser beam representative of the image to be exposed on the scanned surface. The laser beam defines an optical path between the laser mechanism and the scanned surface. A laser beam shaping system is positioned along the optical path for focusing and shaping the laser beam onto the scanned surface. A scanning and directing system is provided for directing the laser beam to the scanned surface and scanning the laser beam across the scanned surface in an image-wise pattern. A unibody attenuation mechanism is positioned along the optical path for power attenuation of the laser beam, wherein the unibody variable density power attenuation mechanism is a linear density wedge.

27 Claims, 29 Drawing Sheets

U.S. PATENT DOCUMENTS

| | | | |
|---|---|---|---|
| 4,971,544 | 11/1990 | Schneeberger | 425/258 |
| 4,999,142 | 3/1991 | Fukushima et al. | 264/1.7 |
| 5,029,956 | 7/1991 | Takanashi et al. | 359/205 |
| 5,033,806 | 7/1991 | Tomita et al. | 347/256 |
| 5,063,292 | 11/1991 | Brueggemann | 250/236 |
| 5,099,342 | 3/1992 | Ziegler | 358/487 |
| 5,114,217 | 5/1992 | Beiser | 359/216 |
| 5,124,089 | 6/1992 | Ohkoshi et al. | 264/1.38 |
| 5,183,597 | 2/1993 | Lu | 264/1.38 |
| 5,196,957 | 3/1993 | Brueggemann | 359/206 |
| 5,204,775 | 4/1993 | McDevitt | 359/442 |
| 5,208,701 | 5/1993 | Maeda | 359/574 |
| 5,227,910 | 7/1993 | Khattak | 359/211 |
| 5,235,467 | 8/1993 | Nagamachi | 359/742 |
| 5,247,383 | 9/1993 | Brueggemann | 359/197 |
| 5,292,457 | 3/1994 | Arai et al. | 264/1.7 |
| 5,329,350 | 7/1994 | Wright et al. | 356/218 |
| 5,455,708 | 10/1995 | Harris et al. | 359/226 |
| 5,481,657 | 1/1996 | Schubert et al. | 345/418 |
| 5,486,694 | 1/1996 | Harris | 250/236 |
| 5,498,869 | 3/1996 | Appel et al. | 250/236 |
| 5,517,330 | 5/1996 | Maeda | 358/481 |
| 5,521,999 | 5/1996 | Chuang et al. | 355/88 |
| 5,530,579 | 6/1996 | Nakamura et al. | 359/216 |
| 5,534,101 | 7/1996 | Keyworth et al. | 156/244.12 |
| 5,554,432 | 9/1996 | Sandor et al. | 428/157 |
| 5,566,016 | 10/1996 | Lee | 359/206 |
| 5,583,702 | 12/1996 | Cintra | 359/743 |
| 5,592,211 | 1/1997 | Porter et al. | 347/260 |
| 5,592,324 | 1/1997 | Inagaki et al. | 359/210 |
| 5,596,190 | 1/1997 | Li et al. | 250/236 |
| 5,610,751 | 3/1997 | Sweeney et al. | 359/197 |
| 5,627,627 | 5/1997 | Suzuki | 355/68 |

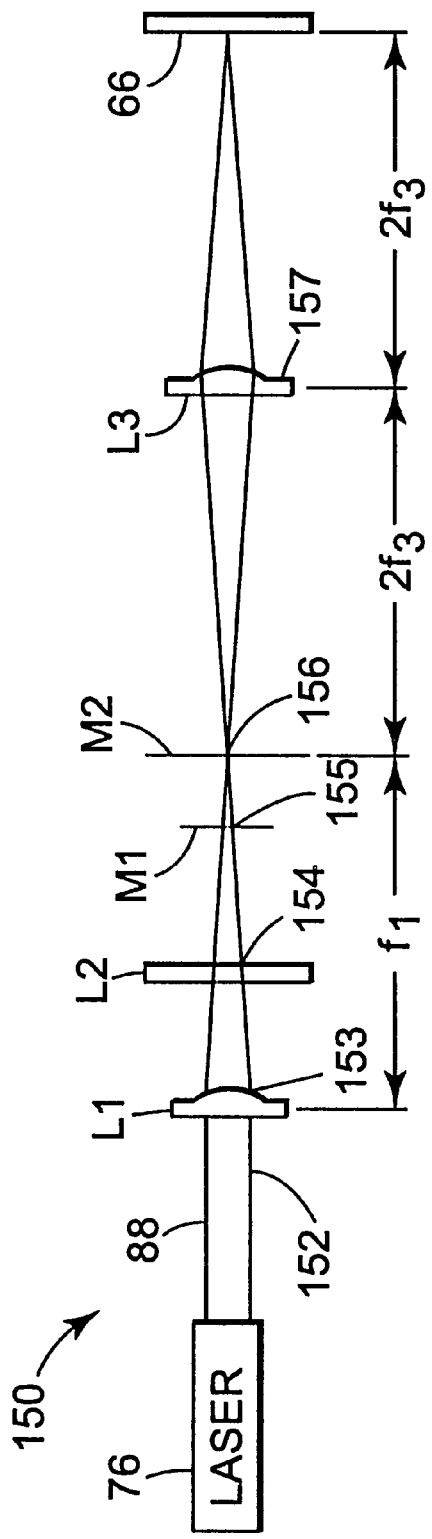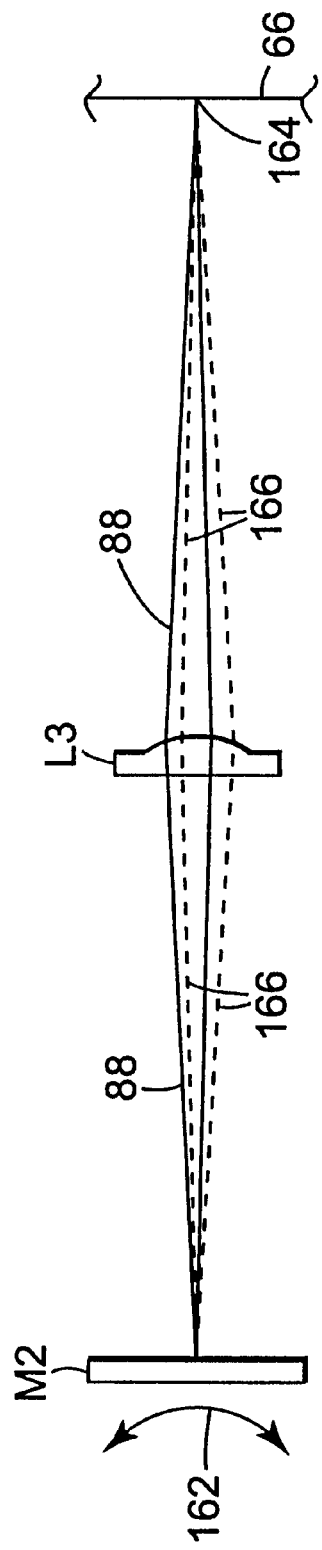
Fig. 6
Fig. 7

OPTICAL SCANNER SYSTEM HAVING A LASER BEAM POWER ATTENUATION MECHANISM

BACKGROUND OF THE INVENTION

The present invention relates generally to optical scanner assemblies and laser imaging systems incorporating such scanners. In particular, the present invention relates to an internal drum type optical scanner assembly having a unibody laser beam power attenuation mechanism, including a variable density attenuator, suitable for use in a medical imaging system.

Laser imaging systems are commonly used to produce photographic images from digital image data generated by magnetic resonance (MR), computed tomography (CT) or other types of scanners. Systems of this type typically include a continuous tone laser imager for exposing the image on photosensitive film, a film processor for developing the film, and an image management subsystem for coordinating the operation of the laser imager and the film processor.

The digital image data is a sequence of digital image values representative of the scanned image. Image processing electronics within the image management subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Optical scanning assemblies are used to provide uniform exposure of the image on photosensitive film. The optical scanning assemblies combine a laser system with unique optical configurations (i.e., lenses and mirrors), for uniform exposure of the image onto the film. Past optical scanning assemblies used for achieving the level of performance required by the medical imaging industry utilize costly components incorporated into complex optical scanning systems. Such systems often combine complex, multi-sided mirrors and lens configurations for directing the laser beam onto a moving or stationary photosensitive film.

Known laser imagers used for medical imaging include a polygonal scanner or a galvanometer scanner. For example, a commonly used polygonal scanner configuration has a polygonal mirror repetitively exposing successive raster lines onto a sheet of moving photosensitive film. The optics must focus the laser beam over a flat image line and compensate for facet-to-facet angular errors in the polygon. These functions have usually been accomplished with combinations of costly precision ground anti-reflection coated glass lenses. The film is moved at a constant speed on rollers where the film is placed at the focus of the scanning laser beam. The film must be moved with a surface velocity constant to better than about 0.5%. Momentary disturbances or perturbations in the motion of the film, such as those caused by striking a film guide, position sensor or nip roller, can cause serious "glitches" in the exposed image, resulting in poor image quality. Avoidance of such perturbations requires that the film path during imaging be free of such obstructions. Such a film path often occupies a considerable amount of space in the laser imaging device.

Another known example of an optical scanner used for laser imaging includes a galvanometer optical scanner assembly having a dual-galvanometer configuration. The dual-galvanometer configuration includes one galvanometer mirror which repetitively sweeps the laser beam to form the raster lines, while a second, slower-moving galvanometer mirror deflects the raster lines down the page of the photographic film. The film, held motionless during exposure, is usually held in a curved platen to avoid the necessity of flattening the image field in both directions. While problems due to film motion are eliminated, since the film can be curved in only one direction at once, such a configuration requires the use of field-flattening optics for its operation. The use of galvanometers, on the other hand, offers relief from the problem of facet-to-facet errors found in polygon-based scanner systems. Galvanometers, like accurate polygon spinners, are precision instruments, and therefore, are very expensive to manufacture.

In light of the known drawbacks of present laser imaging devices, it is desirable to have an optical scanner which does not rely on expensive mirror and optical configurations to compensate for errors inherent in the scanner design. It is desirable to have an optical scanner for use in a laser imager which does not require an extraordinary amount of space nor which requires space considerations due to the introduction of glitches from the film path. Further, it is desirable to have an optical scanner for use with a laser imager which meets the image-quality requirements of the medical imaging industry.

SUMMARY OF THE INVENTION

The present invention is directed to an optical scanner assembly having a unibody beam power attenuation mechanism, for use in a laser imager. The optical scanner assembly is capable of producing images which meet the image-quality requirements of the medical imaging industry. Further, the novel configuration of the optical scanner in accordance with the present invention does not require the use of a complex or expensively manufactured scanner and lens system.

In one exemplary embodiment, the present invention includes an optical scanner assembly for exposing an image on a scanned surface. The optical scanner assembly includes a laser mechanism for producing a laser beam representative of the image to be exposed on the scanned surface. The laser beam defines an optical path between the laser mechanism and the scanned surface. A laser beam shaping system is positioned along the optical path for focusing and shaping the laser beam onto the scanned surface. A scanning and directing system is provided for directing the laser beam to the scanned surface and scanning the laser beam across the scanned surface in an image-wise pattern. A unibody variable density attenuator mechanism is positioned along the optical path for power attenuation of the laser beam, wherein the unibody attenuation mechanism is a linear density wedge.

The laser beam shaping system includes a first cylinder lens positioned along the optical path for shaping and focusing the laser beam in a first direction, and a second cylinder lens positioned along the optical path for shaping and focusing the laser beam in a second direction. The unibody attenuator mechanism has an attenuation orientation which is oriented in the same direction as the second cylinder lens. In one preferred application, the unibody attenuator mechanism is located adjacent the second cylinder lens. The second cylinder lens has a focusing spot at the scanned surface, wherein the combination of the unibody attenuator mechanism and the second cylinder lens does not affect the focusing spot at the scanned surface.

The unibody attenuator mechanism can be adjustable. In one embodiment, the optical scanner assembly further includes an adjustment mechanism coupled to the unibody attenuator mechanism for adjusting the amount of power attenuation of the laser beam. The adjustment mechanism for adjusting the unibody attenuator mechanism may adjust the position of the unibody attenuator mechanism in a direction perpendicular to the optical path. The adjustment mechanism for adjusting the unibody attenuator mechanism can include a screw motor.

The unibody attenuator mechanism can be a very bold density attenuation mechanism. The unibody attenuation mechanism includes a first end and a second end, wherein the degree of attenuation varies between the first end and the second end. In one embodiment, the unibody attenuation mechanism is positioned substantially perpendicular to the optical path having the laser beam passing therethrough, and wherein the attenuation of the laser beam increases as the laser beam is moved from a position proximate the first end to a position proximate the second end.

The unibody attenuation mechanism includes a first side and a second side, wherein the unibody attenuation mechanism shifts the position of the laser beam as it passes through the unibody attenuation mechanism from the first side to the second side.

The unibody attenuation mechanism further includes an attenuator support substrate having a major surface. A varying reflective material covers the major surface. The support substrate can be constructed of glass. The varying reflective material can be a metallic material. In one application, the attenuation support substrate includes a first end and a second end, wherein the reflectivity density of the varying reflective material increases from the first end to the second end. In another application, the unibody attenuation mechanism is partially transmissive. The attenuator support substrate includes a first end and a second end, wherein the transmissive properties of the varying reflective material decreases from the first end to the second end.

In another exemplary embodiment, the present invention includes an optical scanner assembly used in an internal drum type scanner for exposing an image on a photosensitive film. The optical scanner assembly includes a laser mechanism for producing a laser beam representative of the image to be exposed on the photosensitive film. The laser beam defines an optical path between the laser mechanism and the photosensitive film. A laser beam shaping system is positioned along the optical path for focusing and shaping the laser beam. A scanning and directing system is provided for directing the laser beam and scanning the laser beam radially across the photosensitive film in an image-wise pattern. A unibody attenuator mechanism having a first end and a second end, wherein the degree of attenuation varies from the first end to the second end is provided. The unibody attenuator mechanism is positioned along the optical path for power attenuation of the laser beam. The unibody attenuator mechanism may be adjustable.

In yet another exemplary embodiment, the present invention is a laser imaging system. The laser imaging system includes a film feed mechanism, a film exposure mechanism, a film processor mechanism, and a film receiving area. A film transport system is provided for moving a piece of photosensitive film between the film feed mechanism, the film exposure mechanism, the film processor mechanism, and the film receiving area. The film exposure mechanism includes an optical scanner assembly having a unibody attenuation mechanism for power attenuation of a laser beam passing therethrough. The optical scanner assembly is preferably an internal drum type scanner.

The advantages of the present invention will be set forth in part in the description that follows and in part will be apparent from the description or may be learned by practice of the invention. The advantages of the present invention will be realized and attained by means particularly pointed out in the written description and claims, as well as in the appended drawings. It is to be understood, however, that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention. Other objects of the present invention and many attendant advantages of the present invention will be readily appreciated as the same becomes better understood by reference to the following detailed description when considered in connection with the accompanying drawings, in which like reference numerals designate like parts throughout the figures:

FIG. 6 is an optical diagram in the cross-scan direction illustrating an exemplary embodiment of the optical scanner laser beam shaping and directing system shown in FIG. 5;

FIG. 7 is an optical diagram in the cross-scan direction illustrating an exemplary embodiment of the optical scanner assembly laser beam shaping and directing system shown in FIG. 5;

DETAILED DESCRIPTION OF THE PREFERRED EMBODIMENTS

Figure 1:
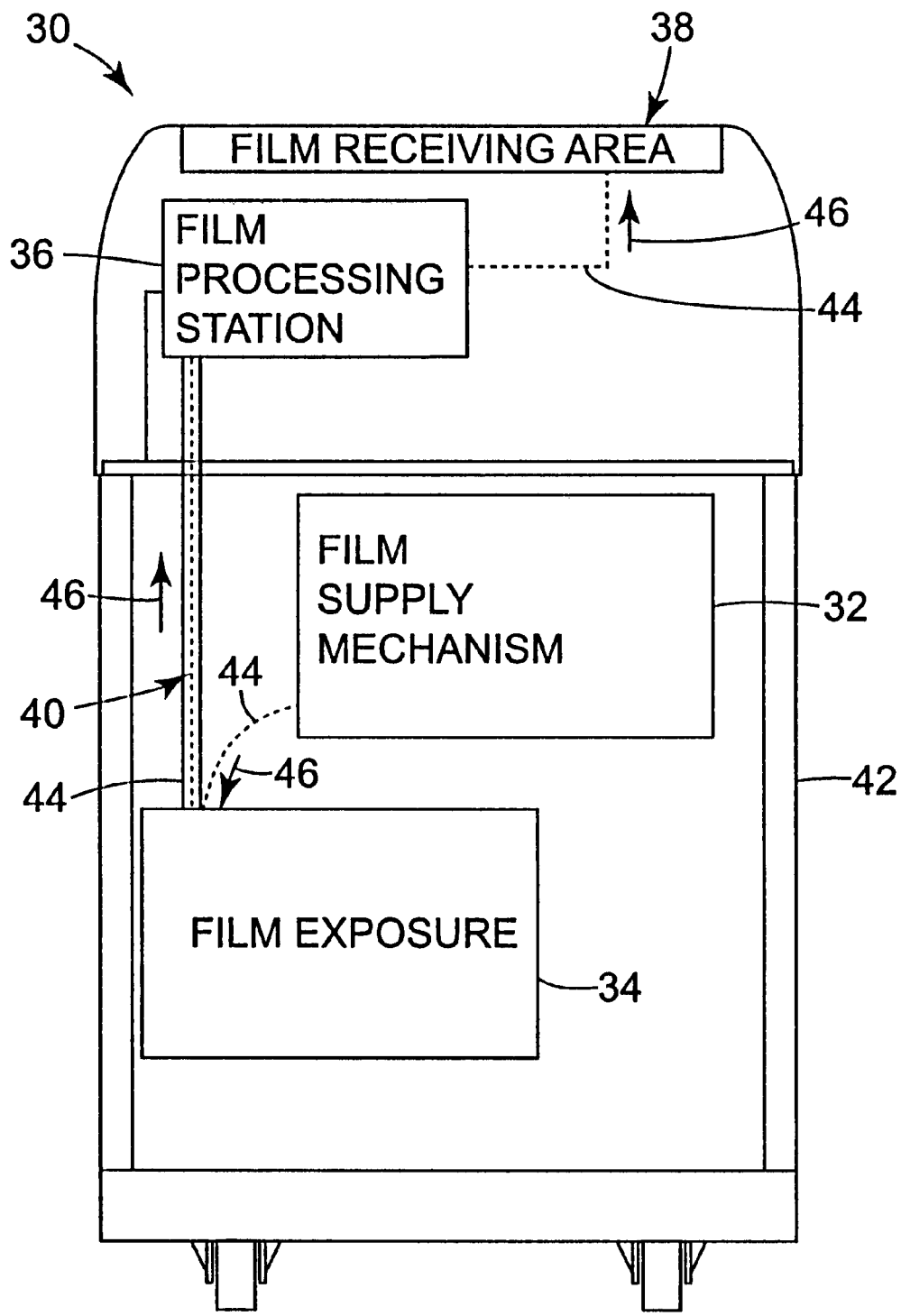
FIG. 1 is an elevational diagram of a laser imaging apparatus in accordance with the present invention.

FIG. 1 is an elevational diagram illustrating an exemplary embodiment of a laser imaging system 30 suitable for use in the medical imaging industry including an optical scanner assembly, in accordance with the present invention. The imaging system 30 includes a film supply mechanism 32, a film exposure assembly 34, a film processing station 36, a film receiving area 38, and a film transport system 40. The film supply mechanism 32, film exposure assembly 34, film processing station 36, and film transport system 40 are all located within an imaging system housing 42.

Photosensitive film is stored within the film supply mechanism 32. The film transport system 40 allows the photosensitive film to be moved between the film exposure assembly 34, film processing station 36, and the film receiving area 38. The film transport system 40 may include a roller system (not shown) to aid in transporting the film along a film transport path, indicated by dashed line 44. The direction of film transport along film transport path 44 is indicated by arrows 46. In particular, the film supply mechanism 32 includes a mechanism (not shown) for feeding a piece of film along film transport path 44 into the film exposure assembly 34 for exposing the desired image on the photosensitive film using the optical scanner assembly in accordance with the present invention. After exposure of the desired image on the photosensitive film, the photosensitive film is moved along the film transport path 44 to the film processing station 36. The film processing station 36 develops the image on the photosensitive film. After film development, the photosensitive film is transported to the film receiving area 38.

Figure 2:
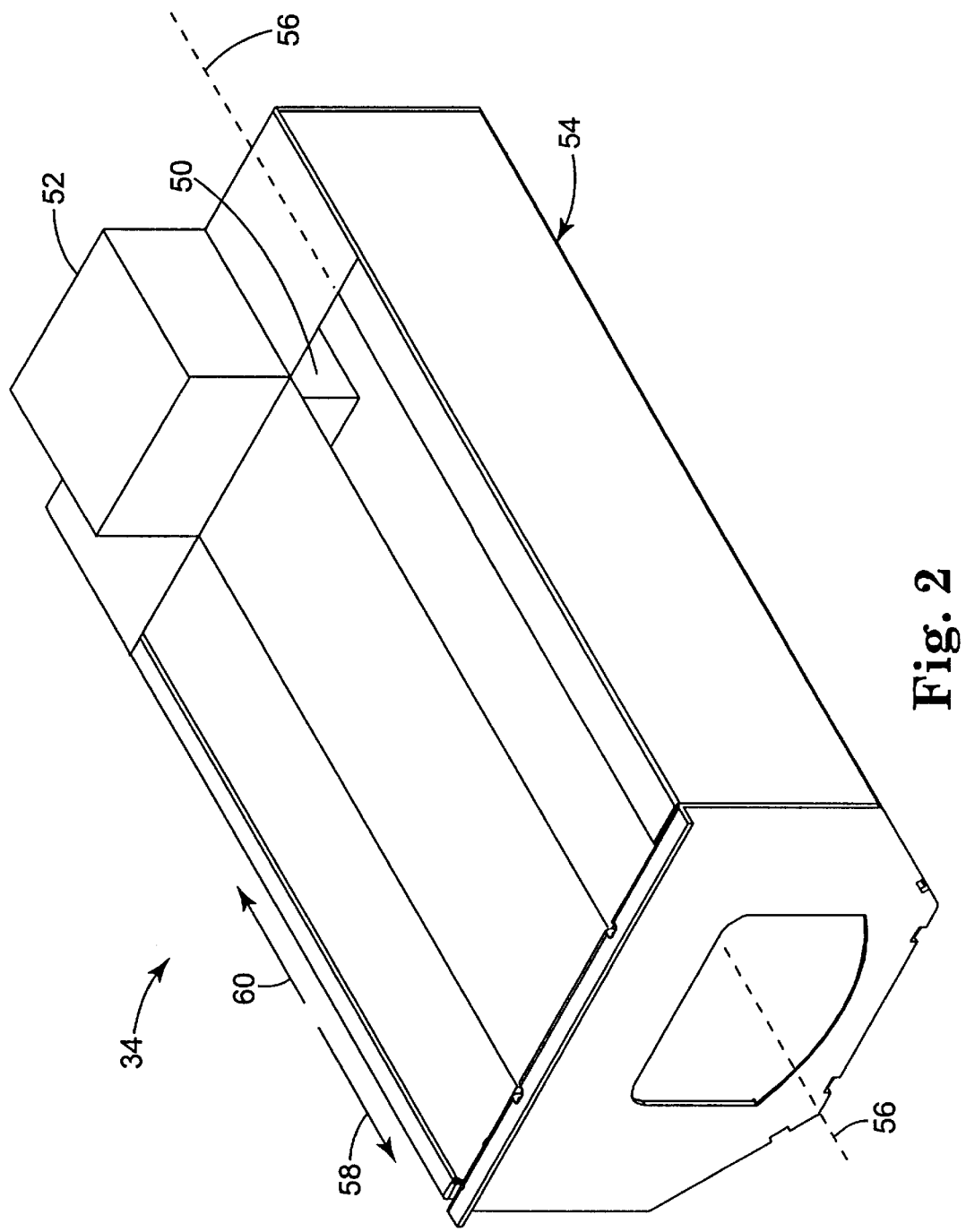
FIG. 2 is a perspective view of an exemplary film exposure assembly having an optical scanner assembly for use in a laser imaging apparatus, in accordance with the present invention.

In FIG. 2, a top perspective view of one exemplary embodiment of the film exposure assembly 34 including an optical scanner assembly in accordance with the present invention is shown. The film exposure assembly 34 has an internal-drum type configuration. In the exemplary embodiment shown, the film exposure assembly 34 includes an optical scanner assembly 50 (better seen in FIG. 3) mechanically coupled to an optics translation system 52, mounted within drum 54 for exposure of the film. The center of curvature of the drum 54, which is located along the drum longitudinal axis, is indicated by dashed line 56. During a scanning process, the optics translation system 52 operates to move the optical scanner assembly 50 along the longitudinal axis 56, indicated by directional arrow 58, and after scanning, returns the optical scanner assembly 50 to a start position, along the longitudinal axis 56, indicated by directional arrow 60.

Figure 3:
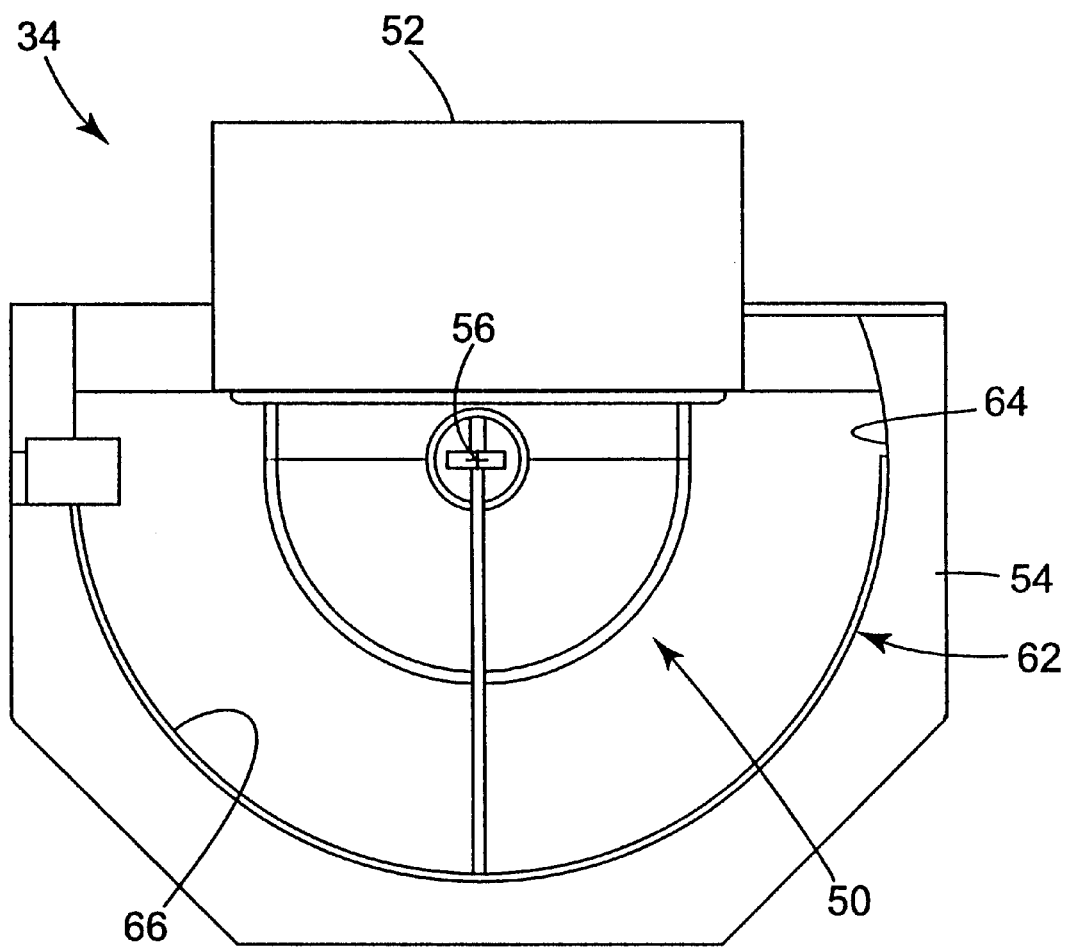
FIG. 3 is an end view of the film exposure assembly shown in FIG. 2.

Referring also to FIG. 3, an end elevational view of the film exposure assembly 34 is shown. Drum 54 includes a film platen 62 having an internal drum surface 64. During exposure of a photosensitive film 66, the photosensitive film 66 is held against the internal drum surface 64, which has a cylindrical or partial cylindrical shape.

In general, the photosensitive film 66 is held against the film platen internal drum surface. The optical scanner assembly 50 scanning laser beam (indicated at 68) emanates radially from the center of curvature of the drum 54, which is located along the drum longitudinal axis 56. The optical scanner assembly 50 scans the laser beam containing image data representative of the image to be exposed in raster lines by rotating about the longitudinal axis 56 of the cylinder drum. As the optical scanner assembly 56 scans the image in raster lines on photosensitive film 66 located on the internal surface of the drum 64, the optics translation system 52 moves the optical scanner assembly 50 along the longitudinal axis 56 to expose the full image on the photosensitive film. The optical scanner assembly in accordance with the present invention is described in detail later in this specification.

In one exemplary embodiment, the film exposure area on the internal drum surface is 17 inches by 14 inches, suitable for exposure of a 17 inch by 14 inch piece of photosensitive film. In the exemplary embodiment disclosed herein, the film is exposed in a vertical direction. In particular, since the 14 inch edge of the film is fed into the exposure module and subsequently scanned in the 17 inch direction, the scanned raster lines appear in the vertical direction. The laser beam is scanned 180° across the internal drum surface, for exposure of 17 inches across the photosensitive film. The optics translation system moves the optical scanner assembly along the longitudinal axis located at the center of curvature of the internal drum surface for a distance of 14 inches, for full exposure of the desired image/images on photosensitive film.

The photosensitive film can be a photosensitive film which is sensitive to laser beam light. In one exemplary embodiment, the film is a light sensitive photothermographic film having a polymer or paper base coated with an emulsion of dry silver or other heat sensitive material. One known film suitable for use in medical imaging processes with the optical scanner assembly in accordance with the present invention is commercially available under the tradename Dryview Imaging Film (DVB or DVC), manufactured by Imation Corp. of Oakdale, Minn.

The optical scanner assembly, components of the optical scanner assembly, and operation of the optical scanner assembly are described in detail in the following paragraphs.

Optical Scanner Assembly

1. Laser Beam Shaping and Directing System.

Figure 4:
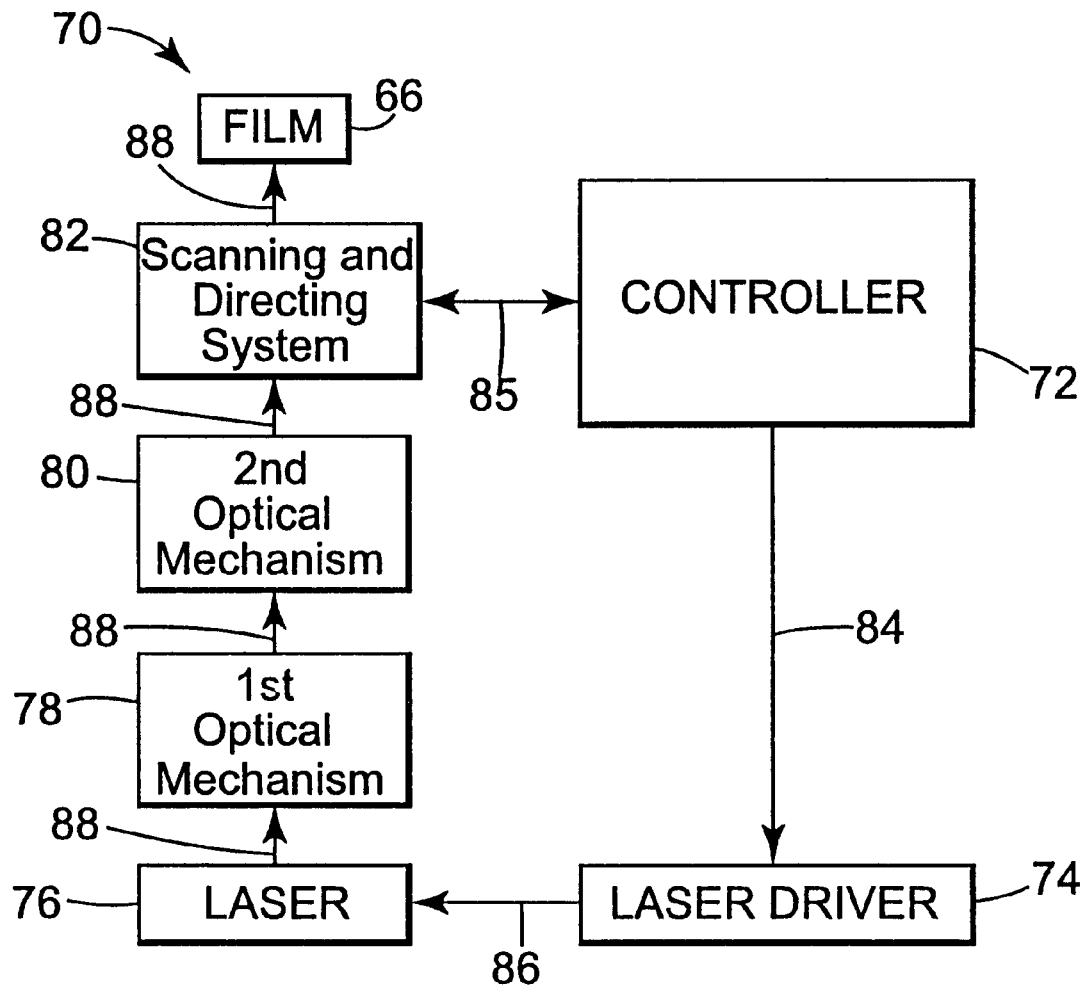
FIG. 4 is a block diagram illustrating an exemplary optical scanner assembly laser beam shaping and directing system in accordance with the present invention.

The optical scanner assembly in accordance with the present invention includes a laser beam shaping and directing system. In FIG. 4, a block diagram of one exemplary embodiment of a laser beam shaping and directing system in accordance with the present invention is generally shown at 70. As shown in FIG. 4, the laser beam shaping and directing system includes a controller 72, a laser driver 74, a laser assembly 76, first optical mechanism 78, second optical mechanism 80, a scanning and directing system 82 positioned in optical alignment with photosensitive film 66. Controller 72 provides an image signal 84 to laser driver 74 representative of the image to be exposed on the photosensitive film 66. Controller 72 also provides control signals to and receives control signals from scanning and directing system 82, indicated at 85. Laser driver 74 is responsive to image signal 84 for providing an output driver signal 86 to laser assembly 76. In response to output driver signal 86, laser assembly 76 emits (produces) a laser beam which is representative of the image to be exposed on the photosensitive film 66. The first optical mechanism 78, second optical mechanism 80 and scanning and directing system 82 function together to shape, focus, and direct the laser beam 88 for exposing the desired image or images on the photosensitive film 66.

The first optical mechanism and second optical mechanism shape the laser beam in two separate directions, which are generally perpendicular to each other. The first optical mechanism 78 includes a lens system which functions to shape the laser beam 88 profile in a first direction (but not a second direction) for focusing the laser beam 88 in a first direction on the film 66. The second optical mechanism 80 includes a lens system which functions to shape the laser beam 88 in the second direction (but not the first direction) for focusing the laser beam 88 in the second direction onto the photosensitive film 66. Scanning and directing system 82 includes a scanner and mirror system for directing the laser beam 88 to the desired location on film 66 and scanning the laser beam 88 across the film surface in a raster pattern for exposing the desired image on film 66.

Figure 5:
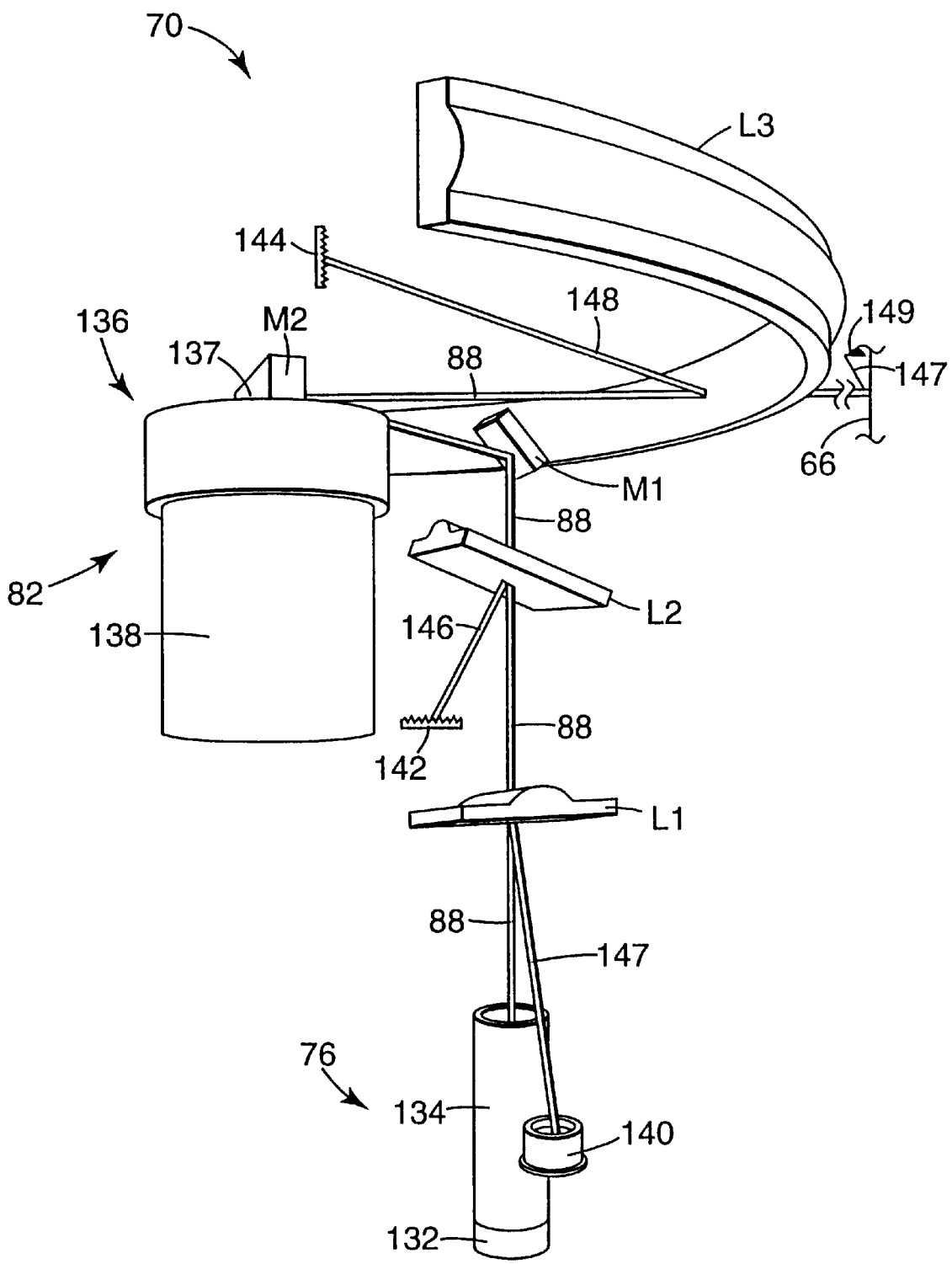
FIG. 5 is a perspective view of one exemplary embodiment of an optical scanner assembly laser beam shaping and directing system in accordance with the present invention.

In FIG. 5, a perspective view of one exemplary embodiment of an optical scanner assembly laser beam shaping and directing system in accordance with the present invention is generally shown. As shown in FIG. 5, the laser beam shaping and directing system 70 includes a laser diode 132, a laser collimator 134, a lens L1, a lens L2, a folding mirror M1, a scanner assembly 136, including a scanner motor 138 and a scanner mirror M2, a flexible lens L3, a feedback sensor 140, an absorbing surface 142, and an absorbing surface 144. As shown in FIG. 5, laser diode 132 and laser collimator 134 comprise the laser assembly 76. First optical mechanism 78 includes lens L1 and lens L3. Second optical mechanism 80 includes lens L2. The scanning and directing system 82 includes folding mirror M1 and scanner assembly 136, including scanner motor 138 and scanner mirror M2.

Laser diode 132, laser collimator 134, lens L1, lens L2, folding mirror M1, scanner mirror M2, and flexible lens L3 are in optical alignment (along a path as defined by laser beam 88) for shaping, focusing and directing laser beam 88 between laser diode 132 and a photosensitive film. In the particular embodiment shown, lens L1 is optically positioned between lens L2 and laser collimator 134. Lens L2 is optically positioned between lens L1 and folding mirror M1. Folding mirror M1 is optically positioned between lens L2 and scanner mirror M2. Scanner mirror M2 is optically positioned between folding mirror M1 and lens L3. Lens L3 is optically positioned between scanner mirror M2 and the film 66. It is recognized that the above laser beam shaping and directing system 70 elements may be alternately configured within the scope of the present invention, such as lens L2 being in optical alignment between collimator 134 and lens L1, and lens L1 being in optical alignment between lens L2 and folding mirror M1.

In summary, the laser diode 132 is electrically coupled to laser driver 104 (shown in FIG. 4). The laser diode 132 emits laser beam 88 through laser collimator 134 such that the collimated laser beam 88 is a uniformly shaped light source (modulated in an image-wise pattern), representative of the image to be exposed on the film. In one preferred embodiment, the collimated laser beam 88 is generally elliptical shaped.

The laser beam 88 is transmitted through lens L1, transmitted through lens L2 and is reflected by the folding mirror M1 such that it is incident on the scanner mirror M2. In one preferred embodiment, the scanner mirror M2 is a two-sided mirror which is mounted on the shaft through an adapter 137 of scanner motor 138. In one embodiment, the scanner motor 138 is a DC brushless motor.

Upon operation of scanner motor 138, the scanner mirror M2 is rotated and the laser beam 88 is reflected outward radially in an approximate conical shape and transmitted through flexible lens L3 for exposing the film 66 in a raster pattern. Both sides of scanner mirror M2 are used for directing the laser beam 88 through flexible lens L3 to expose the film 66. In one embodiment, the laser beam 88 and the motor axis form an angle that is nominally 84°.

In one exemplary embodiment, lens L1, lens L2, and flexible lens L3 are cylinder lenses, and in particular, are cylinder lenses having a plano-convex optical configuration. A plano-convex cylinder lens is a lens having a straight side (i.e., planar) and a convex or curved opposite side. Lens L1 has its convex side facing lens L2. Lens L2 has its convex side facing folding mirror M1, and flexible lens L3 has its convex side facing the film 66. Lens L1 and lens L2 are positioned such that the focusing directions are perpendicular to each other, and as such, lens L1 shapes laser beam 88 in the cross-scan direction, and lens L2 shapes laser beam 88 in the in-scan direction. Each of these lenses and the effect of their orientation will be described in detail later in the specification.

With the present invention, all of the optical elements, including lens L1, lens L2 and flexible lens L3, are tilted from a perpendicular position relative to the optical axis. As such, all of the reflected beams (reflected portions of the laser beam) can be controlled such that they are dumped onto absorbing surfaces to eliminate light scattering from reflected beams or otherwise used. By controlling the reflected beams, lens L1, lens L2, and flexible lens L3 do not require costly anti-reflective coatings.

In particular, lens L1 and lens L2 are tilted relative to an optical path defined by the laser beam 88. In particular, lens L1 and lens L2 each include a longitudinal axis and a transverse axes extending therethrough. Lens L1 and lens L2 transverse axis are perpendicular to each other, and perpendicular to the optical path. The lens L1 and lens L2 longitudinal axes are not perpendicular to the optical path, being angled or "tilted", and are rotated about their respective transverse axis. As will be described later in the specification, the tilt in lens L2 may be used to aid in focusing laser beam 88 at a desired location (for the scanned surface). Further, the reflected beam from tilted lens L1 provides a feedback signal 147 to feedback sensor 140. Operation of the lens feedback system will also be described later in the specification. Lens L2 is also tilted to allow a portion of the laser beam 88 which reflects off the surface of the lens L2, indicated as reflected beam 146, to be dumped onto absorbing surface 142, such that it does not generate undesirable stray light or spurious film exposures.

Flexible lens L3 is tilted from a perpendicular position relative to the optical axis as defined by the laser beam. As such, a portion of laser beam 88 reflects off of flexible lens L3, indicated at 148, and is dumped onto another absorbing surface 144 instead of reflecting directly back into the optics module. Similarly, the optical axis of the laser beam 88 passing through flexible lens L3 is not perpendicular to the position of the film, and as such, the reflected beam 147 from the film is also dumped to an absorbing surface 149 to avoid light scattering. In one embodiment, the incident angle of the laser beam 88 relative to an axis perpendicular to the flexible lens L3 and the film is nominally 6°.

In FIG. 6, an optical diagram illustrating beam shaping in the cross-scan direction is shown. In the exemplary embodiment shown, lens L1 and flexible lens L3 cooperate to focus the laser beam 88 on the film 66 in the cross-scan direction. In particular, laser assembly 76 emits collimated laser beam 88 which is representative of the image to be formed on photosensitive film 66, indicated at 152. As laser beam 88 passes through lens L1 (153), lens L1 acts to focus the laser beam 88 at the position of the spinning mirror M2 (156). As such, mirror M2 is said to be located a distance f1 from lens L1, where f1 is representative of the focal length of lens L1. Between lens L1 and mirror M2, laser beam 88 passes through lens L2, indicated at 154. Due to the orientation of lens L2 (L2 is a cylinder lens positioned such that its focusing direction is generally perpendicular to the focusing direction of lens L1), lens L2 does not effect the shape of laser beam 88 in the cross-scan direction. Additionally, folding mirror M1 (155) acts to direct laser beam 88 at scanner mirror M2.

Scanner mirror M2 rotates to scan laser beam 88 in a raster pattern across the surface of film 66. Located halfway (proximate the midpoint) between scanner mirror M2 and the film 66 is flexible lens L3. In particular, flexible lens L3 is located at a distance which is twice the focal length (2f3) of flexible lens L3, and the film 66 is located a distance from flexible lens L3 which is also twice the focal length (2f3) of flexible lens L3. As such, mirror M2 and the photosensitive film 66 are located at the conjugate points of flexible lens L3.

In FIG. 7, an enlarged optical diagram showing one exemplary embodiment of the relationship between scanner mirror M2, flexible lens L3 and the film 66 in the cross-scan direction is shown. The novel optical configuration in accordance with the present invention, including the positioning of flexible lens L3 between scanner mirror M2 and the film (or scanned) plane 66 may also operate as a mechanism or means for wobble correction. It is recognized that even with a small mirror pointing error between two facets, the beam wobble at the film plane is significant enough such that it may cause artifacts in the image exposed on the film 66. For example, assuming an optical pointing angle error of 10 arcsec and a distance of 137 mm between the scanner mirror and the film, the wobble at the film is 6.6 micrometers.

As shown in FIG. 7, the beam wobble is depicted by directional arrow 162. A number of items may contribute to beam wobble. For example, in addition to beam wobble due to mirror pointing errors, the scanner motor 138 shaft may wobble (possibly due to bearing tolerance), which contributes to the overall beam wobble at the film plane 66.

The novel optical configuration including flexible lens L3 is used as a mechanism or means for wobble correction. The laser beam 88 is focused to a line on the scanner mirror M2, narrower in the cross-scan direction, which is reimaged to the film 66 through flexible lens L3 (indicated at 164). As previously described herein, the laser beam 88 may wobble, indicated by directional arrow 162. As such, the optical path of laser beam 88 between mirror M2 and the film 66 is adjusted by flexible lens L3, indicated by dashed lines 166. Flexible lens L3 operates to redirect the displaced laser beam 166 to the desired location on film 172, indicated at 164. Due to the plano-convex flexible lens L3, even if the laser beam 88 is shifted due to wobble effects, flexible lens L3 redirects the laser beam 88 to the desired location 164 on film 66. As such, flexible lens L3 provides for correction for beam wobble.

Figure 8:
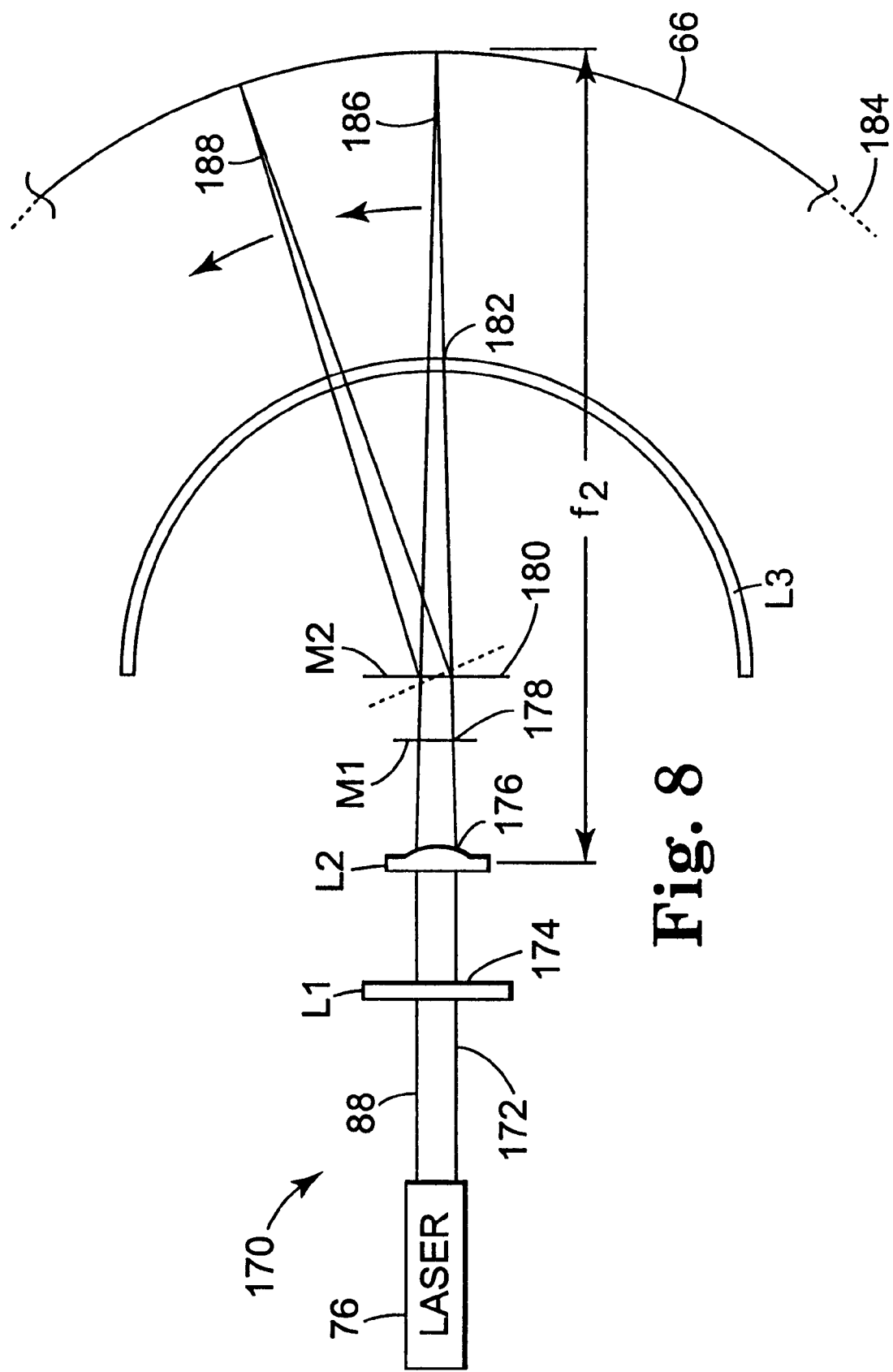
FIG. 8 is an optical diagram in the in-scan direction illustrating an exemplary embodiment of the optical scanner assembly laser beam shaping and directing system shown in FIG. 5.

In FIG. 8, an optical diagram illustrating operation of the novel lens configuration in the in-scan direction, in accordance with the present invention, is generally shown at 170. Collimated laser beam 88 (at 172) is emitted from laser assembly 76 and transmitted through lens L1 (at 174) to lens L2 (at 176). In the in-scan direction, lens L1 does not affect the shape of laser beam 88. Lens L2 operates to focus the laser beam 88 in the in-scan direction onto the film 66. As such, the distance between lens L2 and the film 66 is equal to the focal length f2 of the lens L2.

Between lens L2 and the film 66, the laser beam 88 is redirected by mirror M1 (at 178) to the rotating scanner mirror M2 (at 180). The rotating scanner mirror M2 directs the laser beam 88 along a scan line 184 across the film plane 66 as it rotates. In FIG. 8, the laser beam 88 is shown in a first position 186, and a second rotated position 188, relative to the first position 186. As the rotating scanner mirror M2 scans the laser beam 88 in the in-scan direction, the laser beam 88 passes through flexible lens L3 (at 182). Flexible lens L3 does not affect the shape of laser beam 88 in the in-scan direction.

In one exemplary embodiment, the laser beam 88 exiting the laser assembly 76 collimator 134 has an elliptical shape, with $1/e^2$ diameters of approximately 1.1 mm and 4.0 mm in the cross-scan and in-scan directions, respectively. In the cross-scan direction, the laser beam 88 is focused by L1, f1=95.6 mm onto the scanner mirror M2 surface. The image on the scanner mirror M2 surface is imaged through the flexible lens L3, having a focal length f3 equal to 34.1 mm, onto the film 66. In the in-scan direction, cylindrical lens L2 having a focal length f2 equals 192 mm, focuses the collimated laser beam 88 to the film plane 66 directly. In one preferred embodiment, the nominal laser beam size at the film 66 is 60 micrometers FWHM (full width at half maximum) in the cross-scan direction and 40 micrometers (FWHM) in the in-scan direction.

2. Lenses L1 and L2

Figure 9:
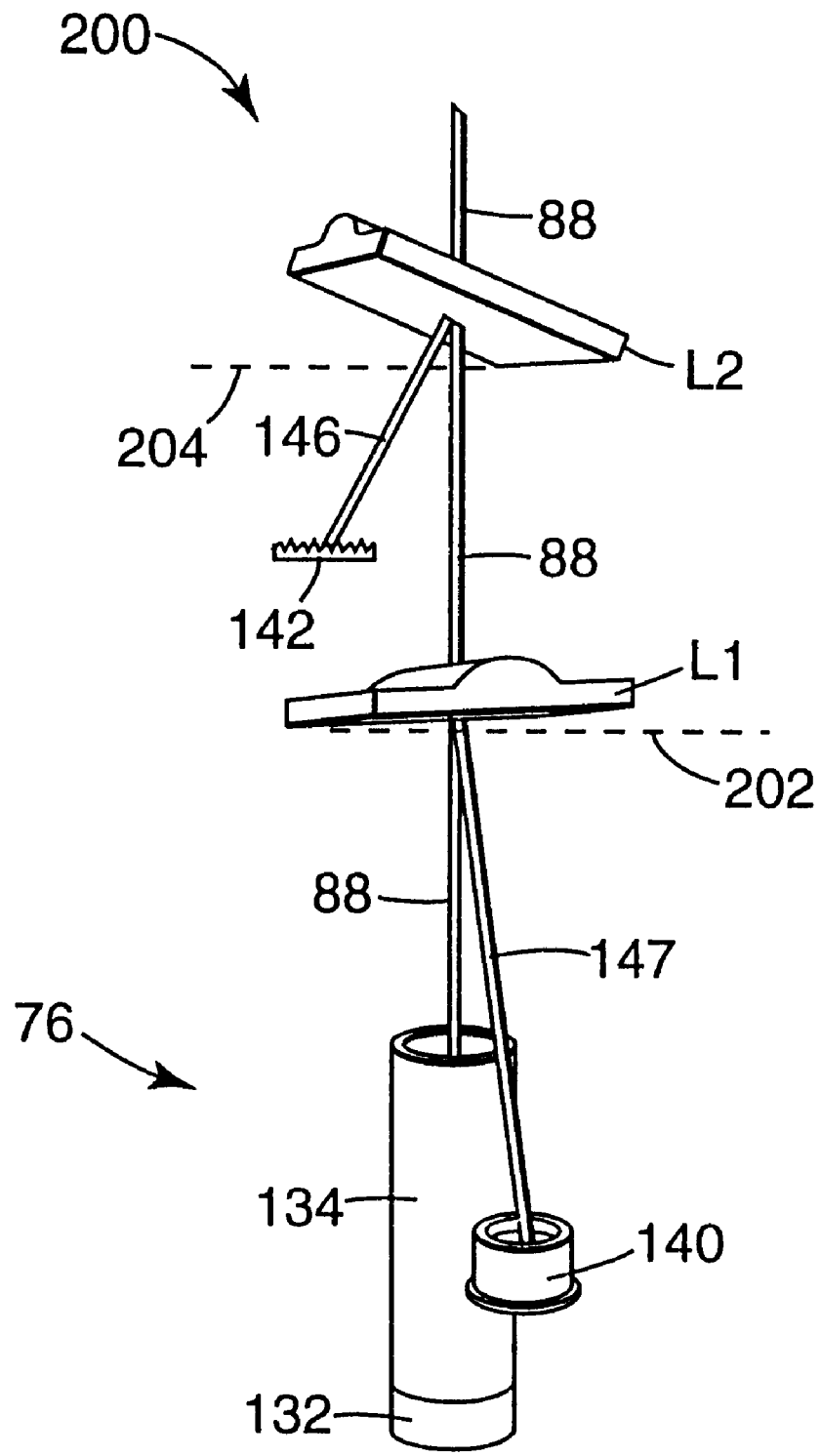
FIG. 9 illustrates an exemplary embodiment of an optical configuration suitable for use in an optical scanner assembly in accordance with the present invention.

In FIG. 9, the optical configuration of lens L1 and lens L2 are shown in perspective view generally at 200. In one preferred embodiment, lens L1 and lens L2 are plano-convex cylinder lenses, and can be similar in size and shape, and in one embodiment generally rigid. As shown in FIG. 9, and described herein, the focusing direction of lens L1 and lens L2 are oriented generally perpendicular to each other. As such, lens L1 effects the shape of laser beam 88 in the cross-scan direction and lens L2 effects the shape of laser beam 88 in the in-scan direction.

Lens L1 and lens L2 are tilted or angled from a position which is perpendicular relative to the optical axis (or optical path) as defined by laser beam 88. By tilting lens L1 and lens L2, the reflected portion of laser beam 88, indicated as reflected beam 146 and reflected beam 147, can be controlled. In the exemplary embodiment shown, the reflected beam 146 is aimed and collected at absorbing surface 142 to avoid light scattering. The control of reflected beam 147 allows lens L1 to act as a beam splitter. Alternatively, reflected beam 147 could also be directed to a light absorbing surface. The reflected beam from both surfaces of L1 (the flat or planar surface and the convex surface), represented by reflected beam 147, is directed to the feedback sensor 140 which provides a feedback signal representative of the laser beam 88. The use of lens L1 as a beam splitter is described in detail later in the specification.

Figure 9A:
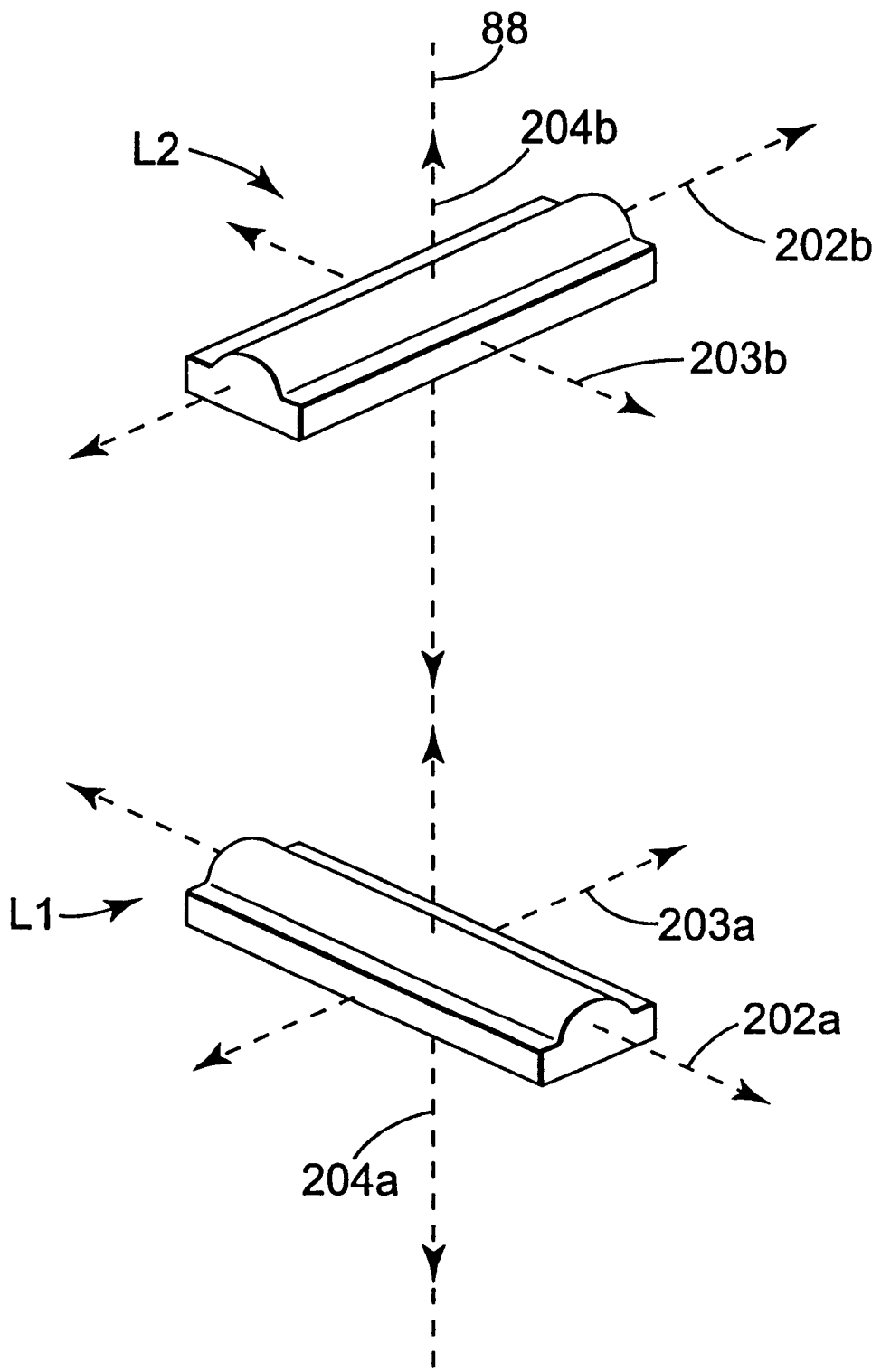
FIG. 9a is a perspective diagram illustrating the orientation of lens L1 and lens L2.

Referring to FIG. 9a, a perspective view illustrating an exemplary embodiment of lens L1 or lens L2 is shown for explanation of the orientation of lens L1 and L2, and the tilting of lens L1 or L2 relative to the optical path defined by laser beam 88. In particular, lens L1 includes a longitudinal axis 202a, a transverse axis 203a, and a normal axis 204a. Similarly, lens L2 includes a longitudinal axis 202b, a transverse axis 203b, and a normal axis 204b. In operation, transverse axis 203a and transverse axis 203b are perpendicular to the optical path defined by laser beam 88. While transverse axis 203a and transverse axis 203b remain stationary, lens L1 and lens L2 are tilted or angled relative to the optical path 88 by rotating lens L1 about transverse axis 203a, and rotating lens L2 about transverse axis 203b. As such, longitudinal axis 203a is not perpendicular to the optical path 88, and longitudinal axis 203b is not perpendicular to the optical path 88.

The tilt of lens L2 serves a dual purpose. In addition to allowing reflected light to be dumped (or directed) onto the absorbing surface 142, it is possible to tune the focal length of the lens L2 by varying the angle of lens L2. L2 is rotatable about its transverse axis. A mechanism is provided for rotating lens L2 about its transverse axis. In particular, during the manufacturing and assembly of the optical scanner assembly 50, lens L2 can be rotated (or tilted), about an axis (its transverse axis) that is parallel to the in-scan direction of the laser beam 88, to change its focal length for tuning/calibrating the focal length of lens L2 to be positioned at film 66. In one exemplary embodiment, a rotation angle adjustment of lens L2 from 10° to 40° yields a focal length change of approximately 15%.

Figure 10:
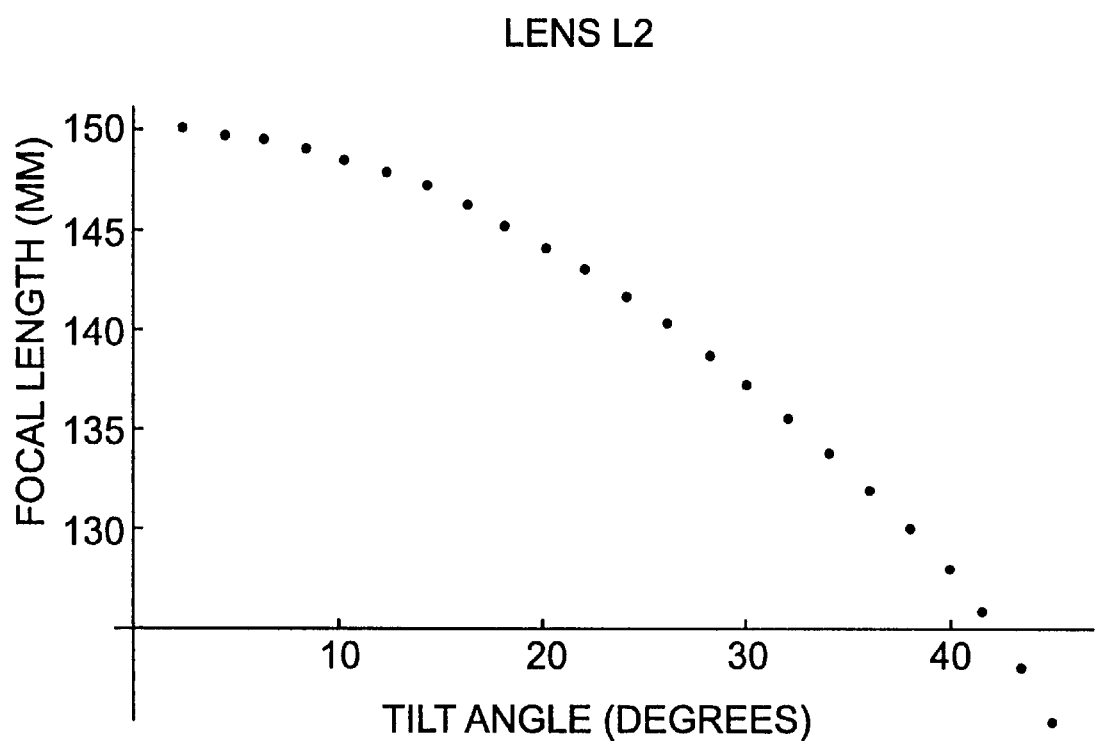
FIG. 10 is a graph illustrating focal length versus tilt angle for one exemplary embodiment of a lens in FIG. 9.

In FIG. 10, a representative plot of one exemplary embodiment of the focal length of lens L2 relative to the tilt angle is shown. In this embodiment, lens L2 is a 150 mm lens. By adjusting the tilt angle of lens L2 (by rotating lens L2 about its transverse axis, wherein the tilt angle is defined as the angle between the longitudinal axis of lens L2 and a position wherein the longitudinal axis of lens L2 would be perpendicular to the optical path), the focal length of lens L2 is adjusted or "tuned" for focusing on the film 66, in the in-scan direction. In a conventional optical system, the method of compensating or adjusting for focal length variation of a lens similar to L2 would be to displace the lens along its optical axis. Such a method requires more physical space in the optical scanner assembly to allow for tuning adjustment and displacement of the lens. The novel technique in accordance with the present invention uses a simple plano-convex cylinder lens in which the focal point is adjusted or "tuned" through changing of the tilt angle of the lens. The transverse axis of lens L2 remains stationary. The present technique is useful for reducing the complexity of the optical scanner assembly design and maintains a compact size for the optical scanner assembly. Additional space within the optical scanner assembly for adjustment and displacement of the lens along the optical axis is no longer necessary.

Lens L1 and lens L2 have diffraction limited optical characteristics. As well known to those skilled in the art, since lens L1 and lens L2 have diffraction limited optical characteristics, they may be used to focus a laser beam on a scanned surface, wherein a predictable focus spot size (and position) is achieved across the scanned surface which can be calculated based on the physical characteristics of the lens. As used herein, the term "diffraction limited" can be defined as the property of an optical system, whereby only the effects of diffraction determine the quality of the image it produces. The term "diffraction limited lens" can be defined as a lens with aberrations corrected to the point that residual wave front errors are substantially less than ¼ the wave length of the energy being acted upon. See, the *Photonics Dictionary, 45st Edition,* 1995 (Laurin Publishing, 1995).

Figure 11:
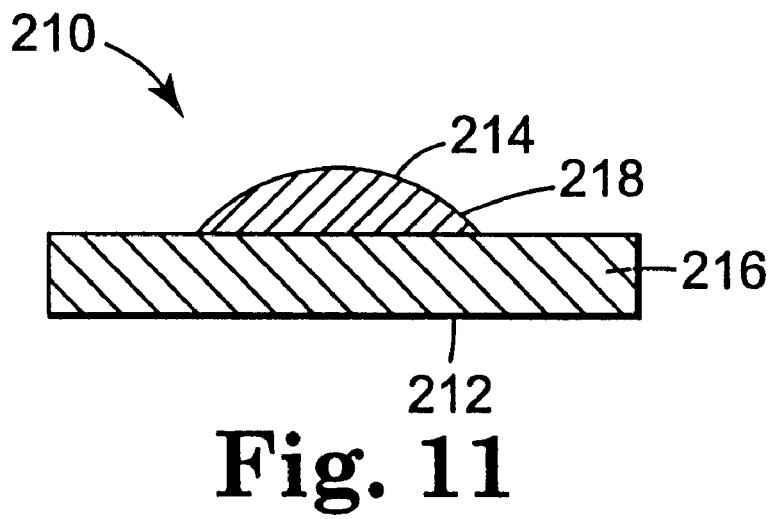
FIG. 11 is a cross-sectional view of one exemplary embodiment of a lens shown in FIG. 9.
Figure 12:
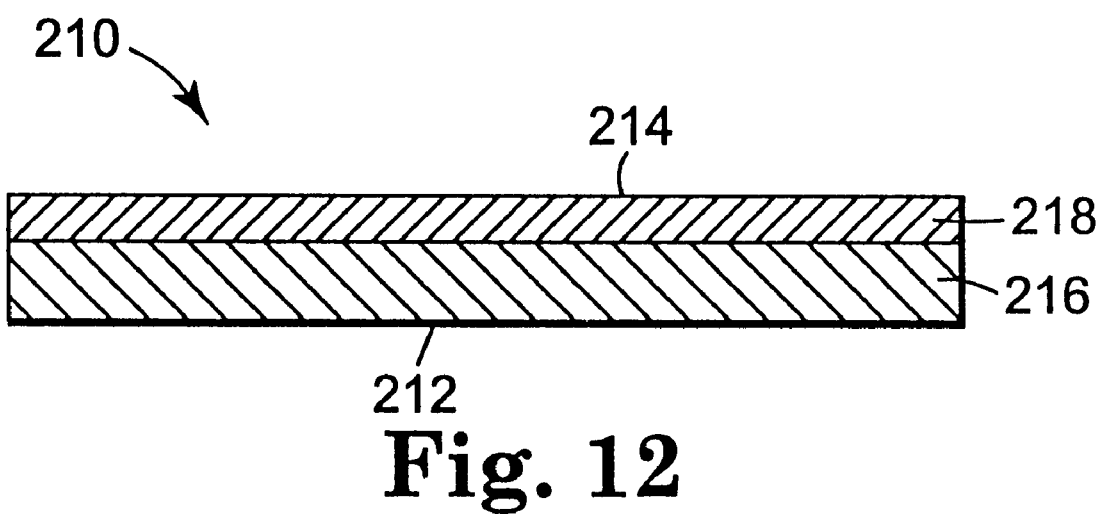
FIG. 12 is a longitudinal cross-sectional view of an exemplary embodiment of a lens shown in FIG. 9.

Cylinder lens L1 and cylinder lens L2 can be similarly constructed. In FIG. 11, a cross-sectional view of a cylinder lens is generally shown at 210. The cylinder lens 210 can be similar to cylinder lens L1 and/or cylinder lens L2. The cylinder lens 210 is a cylinder lens having a plano-convex optical shape. Preferably, the cylinder lens is generally rigid. As such, the cylinder lens 210 includes a first, generally flat (or planar) surface 212 and a second, generally curved (or convex) surface 214. In one exemplary embodiment, the cylinder lens 210 includes a first substrate 216 and a second substrate 218, which are constructed of different materials. The first substrate 216 may be constructed/formed of glass and the second substrate 218 may be constructed/formed of a photopolymer. It is recognized that alternatively, the cylinder lens 210 can be formed of a unitary, solid molded material, such as glass. In one exemplary embodiment, the cylinder lens 210 (L2) first substrate 216 has a length of 25 mm and a width of 25 mm, and the second substrate 218 has a length of 15 mm and a width of 7.5 mm.

Figure 13:
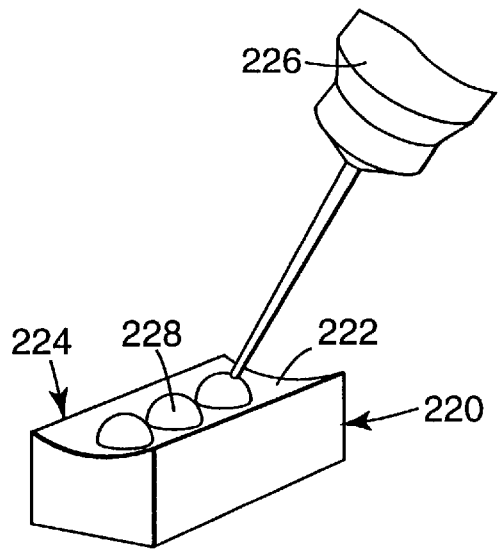
FIG. 13 is a perspective view illustrating a step in a manufacturing process of forming a lens shown in FIG. 9.

Cylinder lens 210 can be constructed/formed using a unique molding process. In one exemplary embodiment, cylinder lens 210 may be formed using the process steps shown in FIGS. 13, 14 and 15. In reference to FIG. 13, a mold 220 is provided having a top surface 222 which is curved corresponding to the desired curvature of the cylinder lens second curved surface 214 (for example, a concave surface will form a convex lens surface). In one exemplary embodiment, the mold 220,may be formed of glass, wherein the curved top surface 222 is ground or diamond cut to the desired shape. The mold curved surface 222 is provided with a non-stick coating, indicated at 224. In one exemplary embodiment, a suitable non-stick coating is a Silane coating, commercially available from PCR, Inc. in Gainesville, Fla. A computer controlled dispenser 226 may be provided for dispensing a UV curable photopolymer 228 which forms the cylinder lens second substrate 218. Dispenser 226 is operated to dispense UV curable photopolymer in discrete droplet form onto the mold 220 assembly including non-stick coating 224. In one exemplary embodiment, the UV curable photopolymer is Summers Laboratory's J-91, located in Fort Washington, Pa. The dispenser 226 dispenses approximately 7 droplets per inch, having a droplet weight of approximately 1.5 mg.

Figure 14:
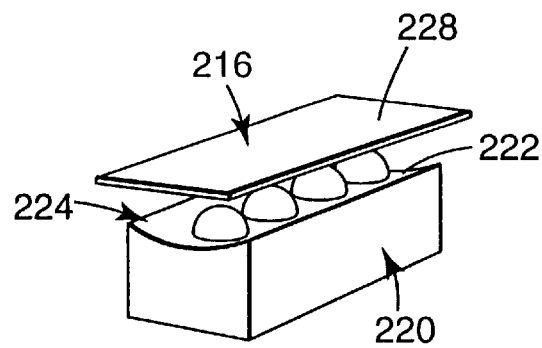
FIG. 14 is a perspective view illustrating another step in a manufacturing process of forming a lens shown in FIG. 9.
Figure 15:
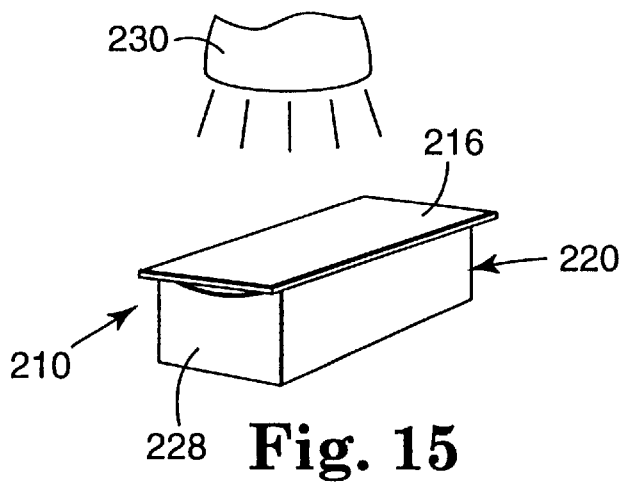
FIG. 15 is a perspective view illustrating another step in a manufacturing process of forming a lens shown in FIG. 9.

In reference to FIG. 14, the first substrate 216 is placed over the charged mold 220, sandwiching the UV curable photopolymer 228 between the first substrate 216 and the mold curved surface 222. In reference to FIG. 15, a UV light source 230 is provided for curing the cylinder lens assembly 210. The UV light source 230 is positioned over the lens and mold assembly for an amount of time required for curing the photopolymer first substrate 216 onto the second substrate 218. After curing, the cylinder lens 210 may be removed from the mold 220. Due to the non-stick coating 224, the cylinder lens may be easily removed from the mold 220.

3. Laser Feedback Control System

Figure 16:
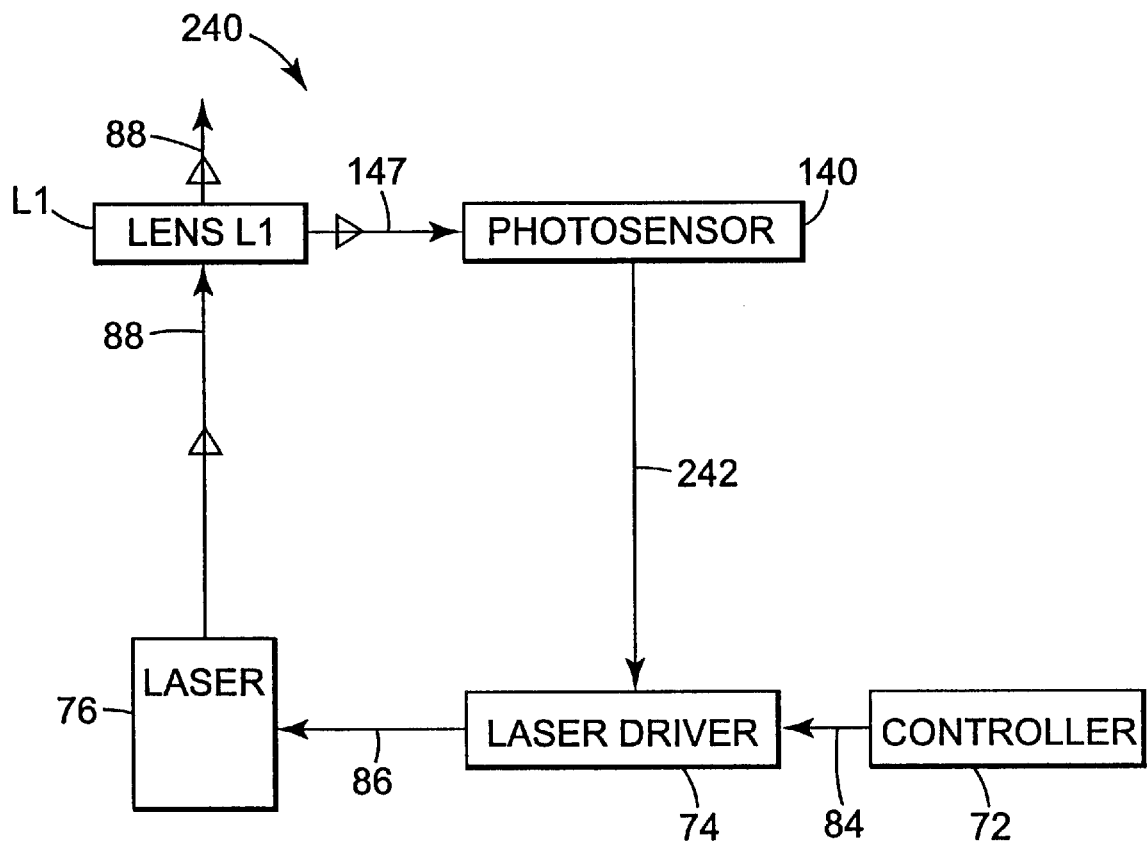
FIG. 16 is a block diagram illustrating an exemplary embodiment of a laser beam feedback control system for use in an optical scanner system, in accordance with the present invention.

The novel optical configuration of lens L1 effectively allows lens L1 to be utilized as a "beam splitter" in a laser feedback control system. As previously stated herein, the tilting of lens L1 allows the reflected beam 147 of laser beam 88 to be directed to photosensor 140, such that it may be used in a feedback system for monitoring and stabilizing the laser assembly 76 (see, FIG. 9 and FIG. 9a). Although the lens L1 transverse axis remains perpendicular to the optical path defined by laser beam 88, the longitudinal axis is rotated about the transverse axis such that the longitudinal axis is not perpendicular to the optical path, thereby directing reflected beam 147 at photosensor 140. In FIG. 16, a block diagram is generally shown at 240, showing lens L1 as a beam splitter in a laser feedback control system. As shown in FIG. 16, and similar to operations previously described herein, laser assembly 76 emits (produces) laser beam 88 which is transmitted through lens L1. A portion of the laser beam 88 is reflected off the surface of lens L1, which has previously been described herein as reflected beam 147. Due to the novel tilted configuration of lens L1, reflected beam 147 is directed to the active region of photosensor 140. In one exemplary embodiment, 90% of the laser beam is transmitted through lens C1 and 10% of the laser beam is reflected to photosensor 140 as reflected beam 147.

Photosensor 140 is responsive to the reflected beam 147 for providing an output signal 242 to laser driver 74 which is respresentative of the power of the reflected beam 147. In response to feedback signal 242 and image signal 84, laser driver 74 provides modulated output signal 86 to laser assembly 76.

Figure 17:
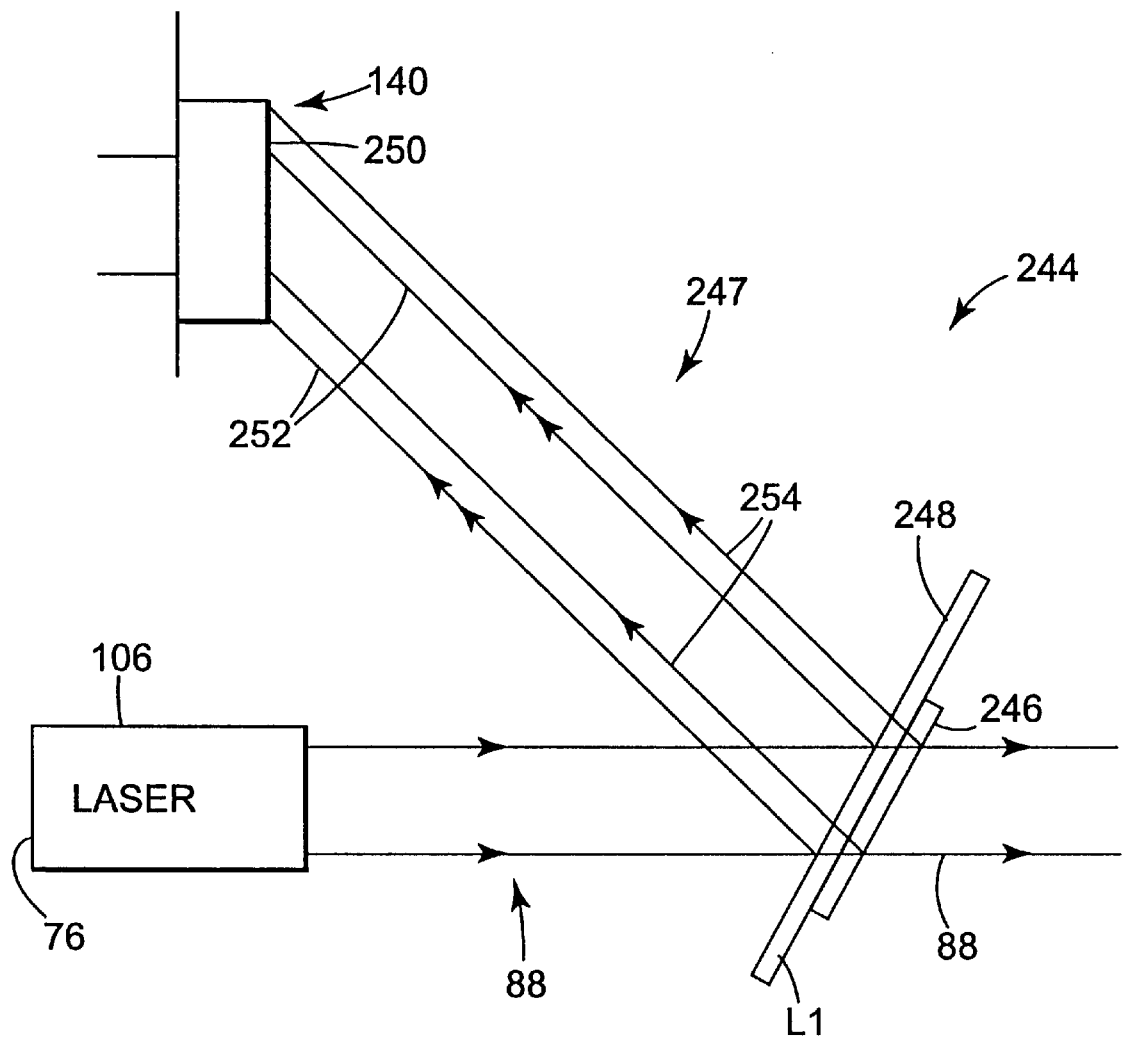
FIG. 17 is a top view of an exemplary embodiment of the use of a lens as a beamsplitter in a laser feedback control system, in accordance with the present invention is shown.

In FIG. 17, a top view of an exemplary embodiment of the use of the lens L1 in a laser feedback control system is shown at 244. As shown in FIG. 17, cylinder lens L1 includes a top surface 246 and a bottom surface 248. The reflected beam 147 is comprised of reflections off of the cylinder lens top surface 246 (convex surface), indicated at 254, and bottom surface 248 (flat or planar surface), indicated at 252. Correspondingly, the photosensor 140 includes an active region 250 which is large enough to receive the reflected beams 252, 254 from the top surface 246 and the bottom surface 248.

Laser assembly 76 emits a collimated light beam in the form of laser beam 88 which is transmitted through lens L1. The reflected beam 247 represents the reflected portion (feedback signal) which reflects off of lens L1 and is directed towards photosensor 140. In particular, first reflected portion 252 is reflected from the cylinder lens bottom surface 248, and second reflected portion 254 is reflected from the cylinder lens top surface 246, onto the photosensor 140 active region 250.

Figure 18:
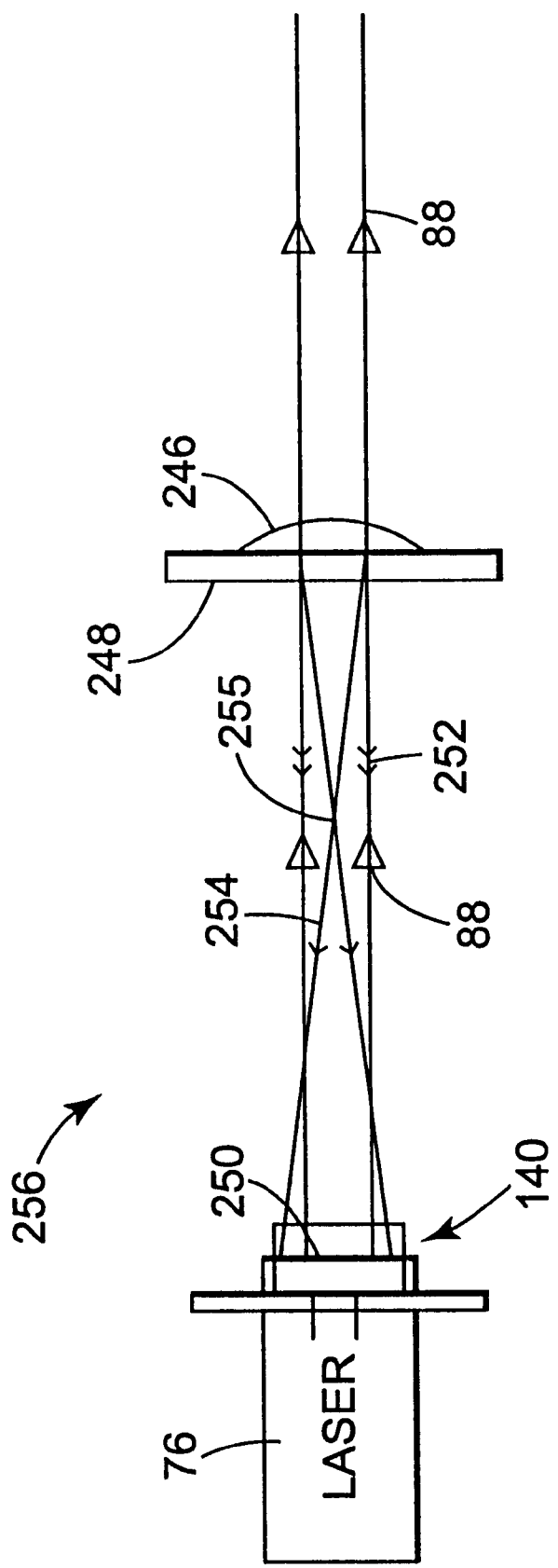
FIG. 18 is a side view illustrating one exemplary embodiment of the use of a lens as a beamsplitter in a laser feedback control system, in accordance with the present invention.

In FIG. 18, a side view of the lens feedback control system is shown at 256. In the cross-scan direction, reflected beam 252 from bottom surface 248 is reflected directly onto photosensor 140 (active region 250). The reflected beam is convergent from the top surface. In this configuration, the focal point is on reflected side. It is noted that since top surface 246 is convex shaped, the reflected beam 252 from top surface 246 reaches a focal point 255 approximately midway before it is incident onto the photosensor 140.

4. Flexible Lens L3

Figure 19:
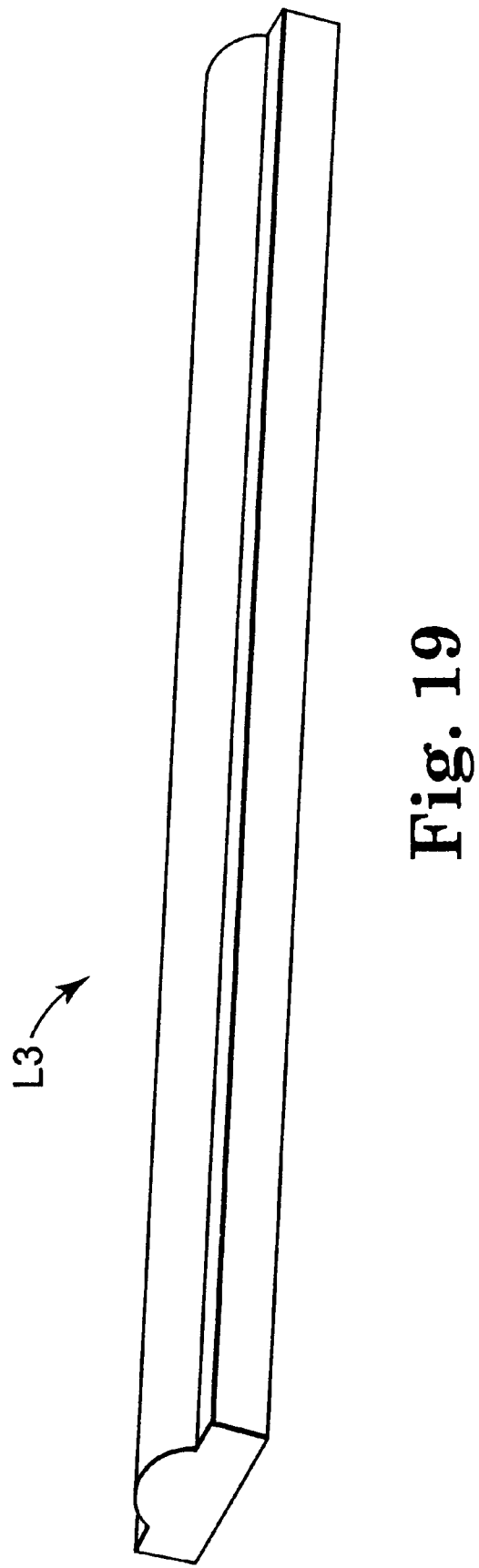
FIG. 19 a top perspective view of an exemplary embodiment of a flexible cylinder lens in accordance with the present invention.

In FIG. 19, flexible lens L3 is generally shown in perspective view. In the exemplary embodiment shown, flexible lens L3 is a cylinder lens having a plano-convex optical shape. The flexible lens L3 is formed of a generally flexible material which allows flexible lens L3 to be easily shaped to a desired curvature, such as is required by the optical scanner assembly 60. The flexible lens L3 is flexible enough to be wrapped onto a guide. The flexible lens L3 is capable of being uniformly flexed beyond a 180° arc, while maintaining and exhibiting diffraction limited optical characteristics, and as such, allows the flexible lens L3 to be used in a laser imaging system suitable for medical applications.

Figure 20:
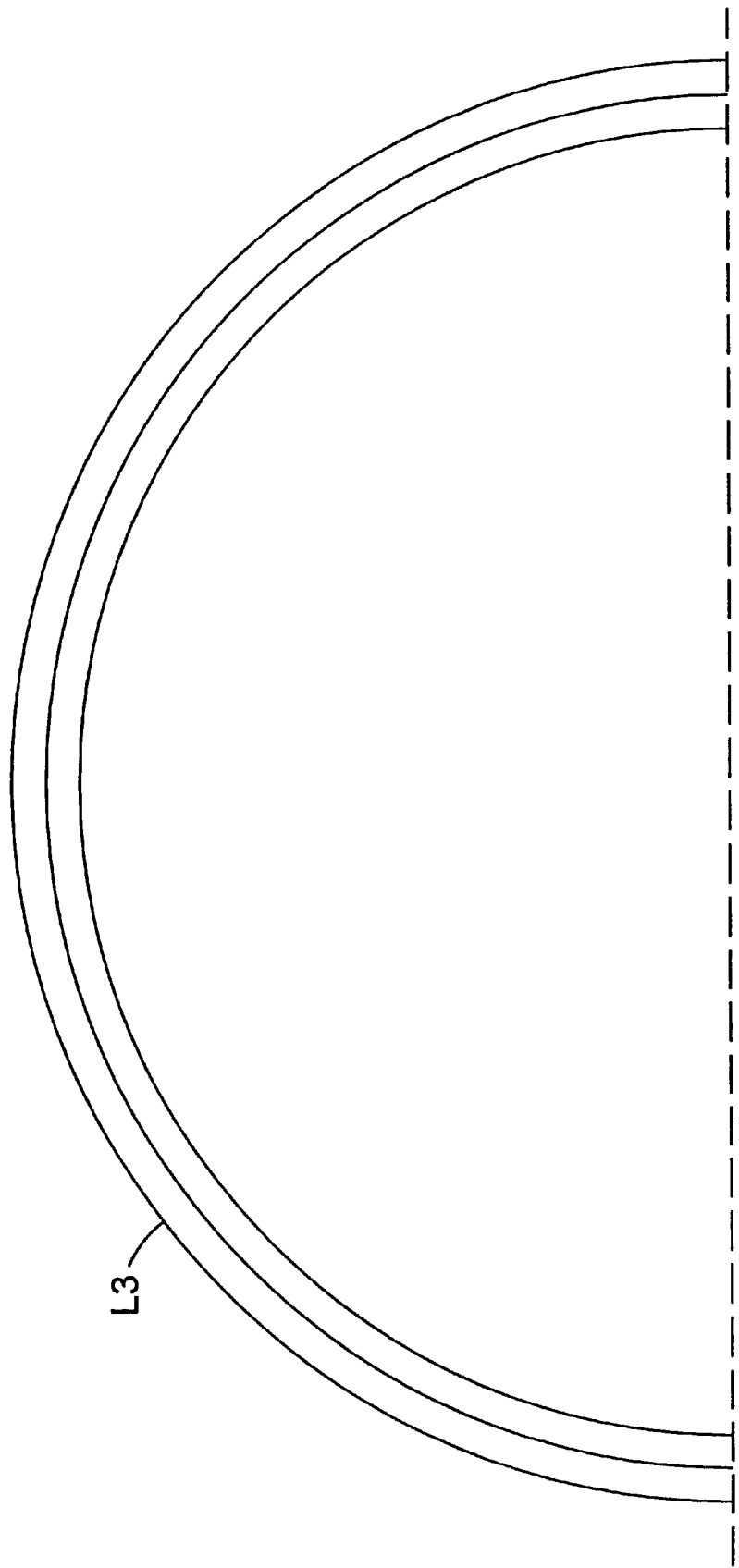
FIG. 20 illustrates an edge view of the flexible cylinder lens shown in FIG. 19 in a curved position.
Figure 21:
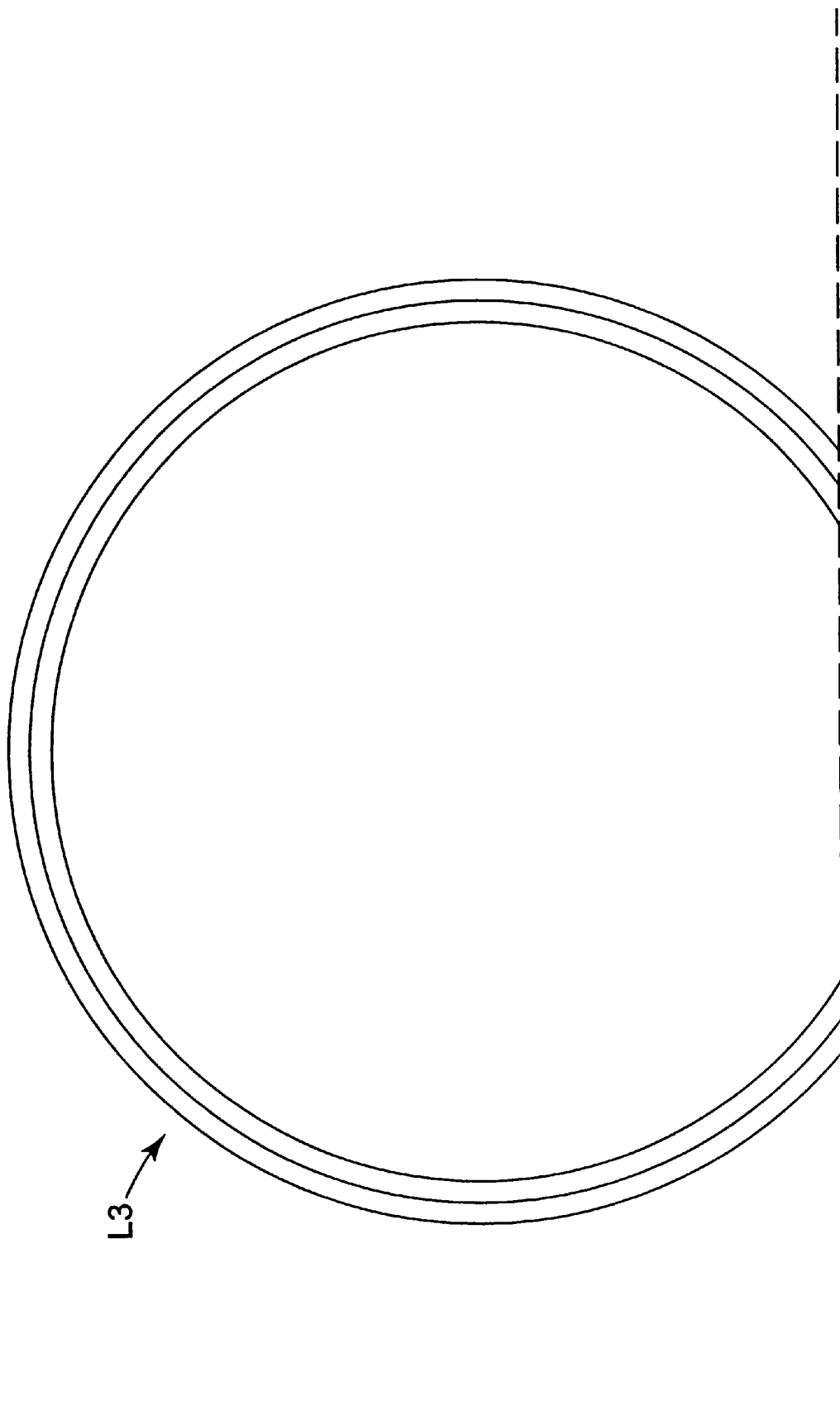
FIG. 21 illustrates another exemplary embodiment of an edge view of the flexible cylinder lens shown in FIG. 19 in a flexed or curved position.

In reference to FIG. 20, flexible lens L3 is a relatively thin, ribbon-like lens. Flexible lens L3 is a flexible, diffraction-limited lens which lends itself most readily to the production of long (several inches) positive cylinder lenses that can be easily bent into arbitrary shapes, such as the 180° arc shown. In particular, flexible lens L3 can be utilized in one-dimensional laser scanning systems, in which a beam of light is scanned over a considerable distance (many inches), such as the laser imaging system shown in FIG. 1. Referring to FIG. 21, flexible lens L3 can be flexed beyond a 180° arc, allowing the flexible lens L3 to be used in many applications which require the use of a flexible lens, either for obtaining desired optical characteristics or due to space constraints, without causing damage to the lens or damaging the optical characteristics of the lens. Flexible lens L3 is capable of being "flexed" or "bent" in over a 180° arc, while exhibiting and maintaining diffraction limited optical characteristics. As well known to those skilled in the art, by maintaining diffraction limited optical characteristics if a flexible lens in accordance with the present invention is used to focus a laser beam on a scanned surface, a predictable focus spot size (and position) is achieved across the scanned surface which can be calculated based on the physical characteristics of the lens. As used herein, the term "diffraction limited" can be defined as the property of an optical system, whereby only the effects of diffraction determine the quality of the image it produces. The term "diffraction limited lens" can be defined as a lens with aberrations corrected to the point that residual wavefront errors are substantially less than ¼ the wavelength of the energy being acted upon. See, the *Photonics Dictionary, 41st Edition,* 1995 (Laurin Publishing, 1995).

Known conventional polygonal scanning systems often require the use of a rigid torodial or rigid cylinder shaped lens as part of field-flattening lenses for producing an image on photosensitive film. Such lenses are complex, costly and difficult to produce. These lens have typically been ground out of glass, which do not lend themselves to being easily bent into arbitrary shapes. The novel flexible lens L3 in accordance with the present invention lends itself most readily to the production of long, positive cylinder lenses that can be easily bent into arbitrary shapes. Further, the method of construction described herein allows the construction of such lenses using a simple unique cast and cure system followed by using a simple guide for bending the flexible lens into the required shape for a desired application. It is recognized that an alternative method to construction of flexible lens L3 would be to injection-mold the lens out of plastic. However, it is also recognized that creating long, diffraction-limited cylinder lenses of the type discussed herein would be quite difficult using injection molding processes.

Figure 22:
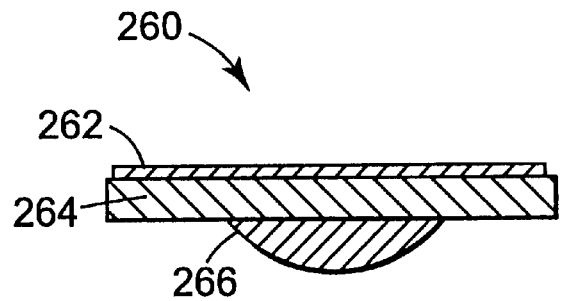
FIG. 22 is a cross-sectional view of one exemplary embodiment of the flexible cylinder lens illustrated in FIG. 19.
Figure 23:
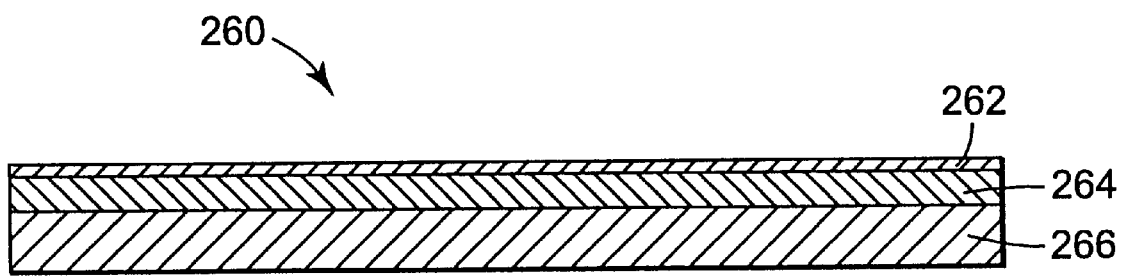
FIG. 23 illustrates a longitudinal cross-sectional view of an exemplary embodiment of the flexible cylinder lens shown in FIG. 19.

In FIG. 22, a cross-sectional view of a flexible cylinder lens is generally shown at 260. The flexible cylinder lens 260 can be similar to flexible lens L3 for use in an optical scanner assembly. In reference also to FIG. 23, a longitudinal cross-sectional view of the flexible cylinder lens 260 is shown. In one exemplary embodiment, the flexible cylinder lens 260 is a multi-layered lens. The flexible cylinder lens 260 includes a first, optical substrate 262, a second, structural or support substrate 264, and a third, optical substrate 266. In the exemplary embodiment shown, first substrate 262 is formed of a photopolymer. Second substrate 264 is preferably a thin, flexible polymeric or plastic substrate. In one embodiment, it is recognized that the second substrate 264 may be formed of a polyester or polycarbonate. Additionally, the third substrate 266 may also be formed of a photopolymer.

In one exemplary embodiment, the flexible cylinder lens 260 is 233 millimeters long having a 33.4 mm focal length with a 3 mm high aperture. The photopolymer used for the first substrate 262 and the third substrate 266 is commercially available from Summers Laboratories under the tradename J-91. The second substrate 264 is formed of a 0.006 inch thick layer of polycarbonate, having a 15 mm by 251 mm substrate size.

Figure 24:
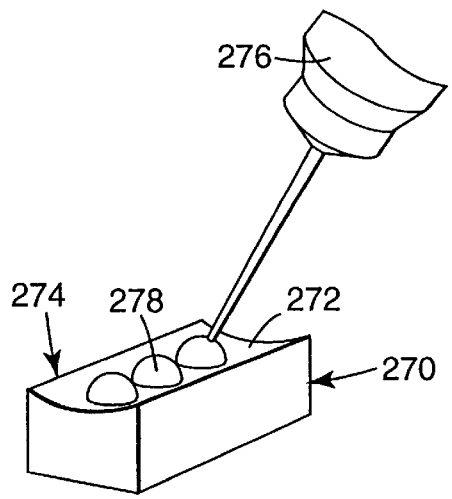
FIG. 24 is a perspective view illustrating an exemplary embodiment of a step in a manufacturing process of forming the lens shown in FIG. 19.

In FIGS. 24–27, one preferred embodiment of forming flexible cylinder lens 260 is shown. In FIG. 24, a cylinder mold 270 is provided having a curved top surface 272 which corresponds to the desired shape of third substrate 266. In one preferred embodiment, the mold is made of glass, wherein the curved top surface 272 is ground to the desired shape. Alternatively, a non-glass mold can also be diamond turned to the desired shape. The cylinder mold 270 includes a non-stick coating 274 coated over the curved top surface 272. The non-stick coating 274 does not allow photopolymer to stick to the mold top surface 272. In one preferred embodiment, the non-stick coating 274 is a silane coating, commercially available from PCR, Inc.

A dispenser 276 is provided for dispensing photopolymer onto the mold top surface 272. Preferably, the dispenser 276 is a computer-controlled dispenser capable of dispensing a photopolymer material in the form of discrete droplets.

The cylinder mold 270 is charged operating the dispenser 276 to dispense discrete droplets of photopolymer, indicated at 278, onto the top surface 272. The discrete droplets 278 are sized and spaced to collect together into a layer, without voids or excess when the next substrate is positioned onto the mold 270. In one exemplary embodiment, the droplet are dispensed at a rate of 1 droplets per 2 mm, having a droplet weight of 0.6 mg.

Figure 25:
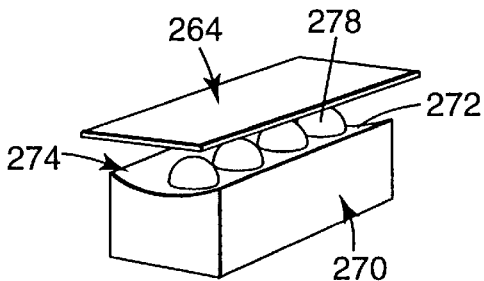
FIG. 25 is a perspective view illustrating an exemplary embodiment of another step in a manufacturing process of forming the lens shown in FIG. 19.
Figure 26:
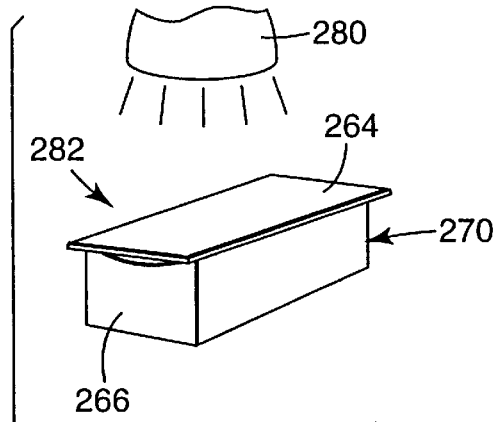
FIG. 26 is a perspective view illustrating an exemplary embodiment of another step in a manufacturing process of forming the lens shown in FIG. 19.

Referring to FIG. 25, the second substrate 264, formed of a flexible plastic, is positioned over the droplets 278 and laid onto the charged cylinder mold 270. In FIG. 26, a UV light source 280 is provided. Light source 280 is positioned over the resulting assembly 282 for a period of time required for curing the photopolymer 278 and mold assembly 282. At this stage, complete curing of the mold assembly is not necessary. It is recognized that the purpose of curing in this step is to avoid the lens being pulled away from the mold 270, which may occur if the entire flexible cylinder lens 260 were cast and cured at once.

Figure 27:
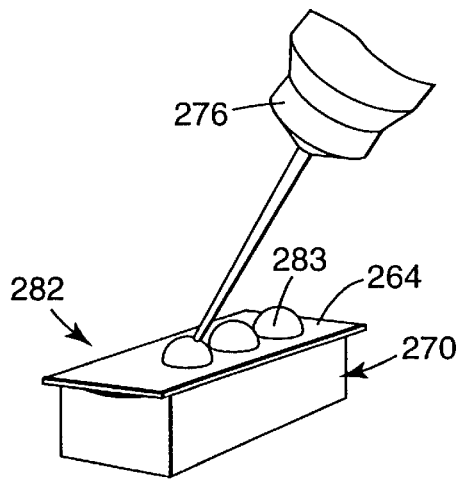
FIG. 27 is a perspective view illustrating an exemplary embodiment of another step in a manufacturing process of forming the lens shown in FIG. 19.

Referring to FIG. 27, the UV light source 280 is removed and the mold 270 is again charged. Dispenser 276 is controlled for dispensing discrete photopolymer droplets 283 onto the charged substrate 264 to form substrate 262.

Figure 28:
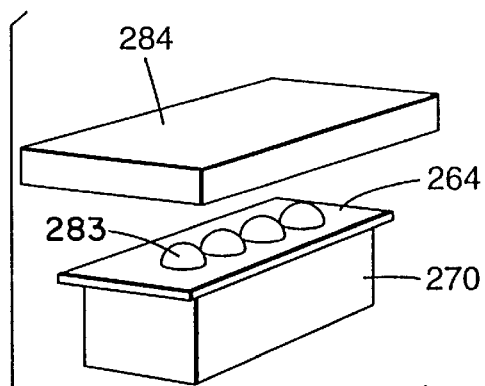
FIG. 28 is a perspective view illustrating an exemplary embodiment of another step in a manufacturing process of forming the lens shown in FIG. 19.
Figure 29:
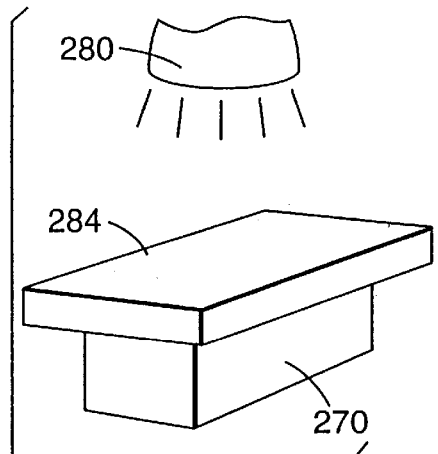
FIG. 29 is a perspective view illustrating an exemplary embodiment of another step in a manufacturing process of forming the lens shown in FIG. 19.

Referring to FIG. 28, a top mold substrate 284 is placed onto the molded construction over the dispensed droplets 283. In reference to FIG. 29, the entire mold assembly is placed under UV light source 280 for a period of time required for complete curing of the mold assembly.

Figure 30:
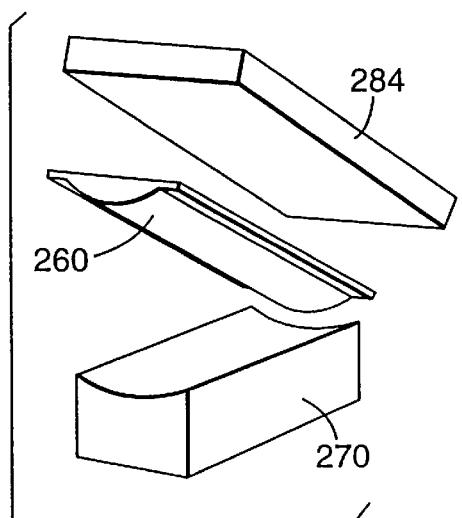
FIG. 30 is a perspective view illustrating an exemplary embodiment of another step in a manufacturing process of forming the lens shown in FIG. 19.
Figure 31:
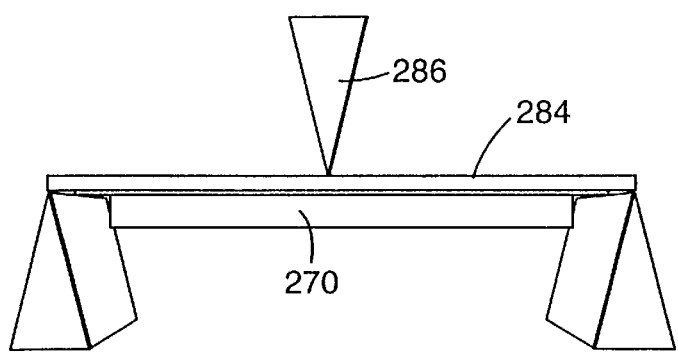
FIG. 31 is a perspective view illustrating an exemplary embodiment of another step in a manufacturing process of forming the lens shown in FIG. 19.

In reference to FIG. 30, the top mold substrate 284 is thin enough to allow it to flex, and has also been treated with a non-stick coating, such as a Silane coating. As such, the top mold substrate 284 may be easily "popped" off the cured molded construction for removal of finished flexible cylinder lens 260. In reference to FIG. 29, it 4A is recognized that external means 286 may be used for aiding in removal of the flexible cylinder lens 260 from the molded assembly, such as applying pressure to the molded assembly.

5. Attenuator System

Figure 32:
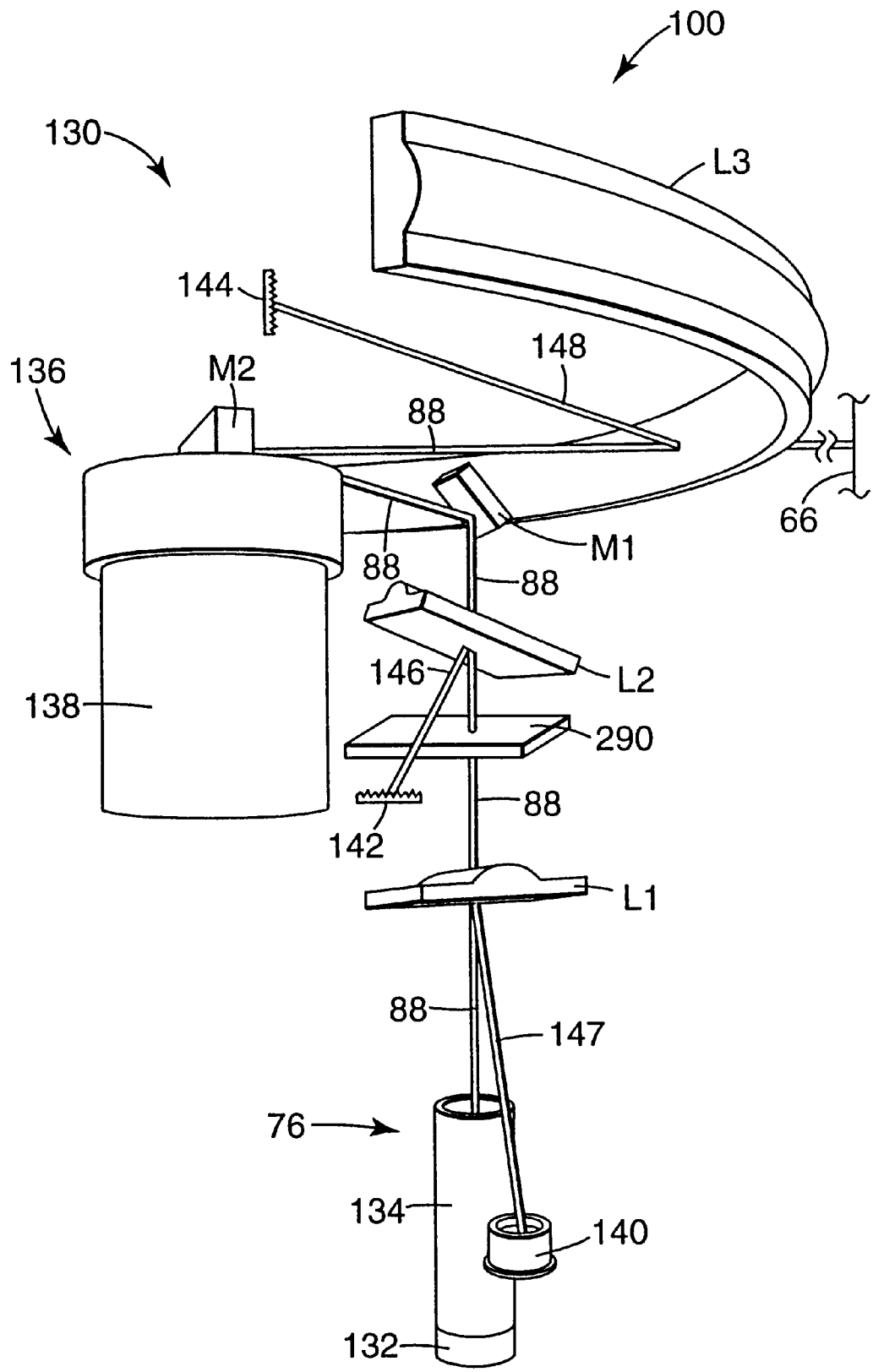
FIG. 32 illustrates a perspective view of an exemplary embodiment of an attenuator for use with an optical scanner assembly, in accordance with the present invention.

In FIG. 32, an exemplary embodiment of the laser beam shaping and directing system 100 in accordance with the present invention is shown, which may further include an attenuator 290. In one embodiment, the attenuator 290 is positioned between lens L1 and lens L2. Attenuator 290 is a variable density attenuator formed of a single unitary construction. The attenuator 290 may function to further shape laser beam 88, and in particular, for controlling and calibrating the power of laser beam 88 transmitted to the scanner mirror M2. Attenuator 290 is positioned between the laser mechanism and L2, and in the embodiment shown, adjacent L2. The unibody attenuation mechanism has a density gradient which is oriented perpendicular to the longitudinal axis of L2. The unique combination of the variable density attenuator 290 and L2 results in no change in the focusing of the laser beam at the focus spot on the photosensitive film.

Known attenuators used in conventional optical scanning systems utilize cross-polarizing attenuators. Such attenuators include two polarized filters which are crossed for attenuating a laser beam passing through the crossed filter portion.

Figure 33:
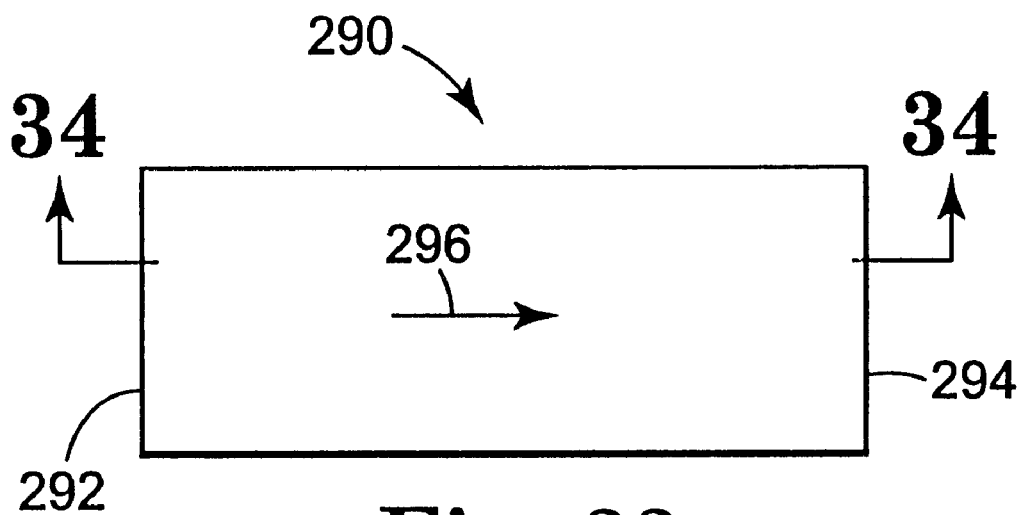
FIG. 33 is a top view of the attenuator shown in FIG. 32.
Figure 34:
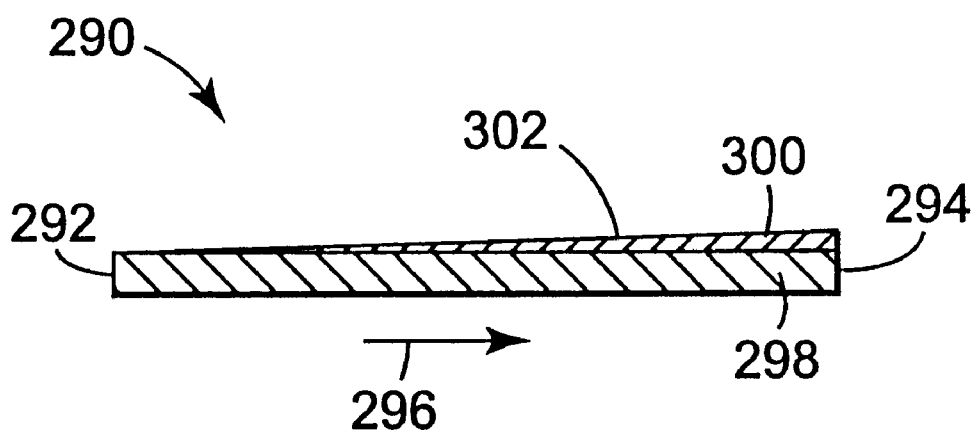
FIG. 34 illustrates a longitudinal cross-sectional view of one embodiment of the attenuator in accordance with the present invention, taken along line 34—34 of FIG. 33.

In FIG. 33, a top view of one exemplary embodiment of the novel attenuator in accordance with the present invention is shown at 290. Attenuator 290 is a variable density attenuator, wherein the amount of laser beam attenuation varies (or increases) from first side 292 to second side 294, indicated by attenuation arrow 296. In FIG. 34, a longitudinal cross section of attenuator 290 taken along line 34—34 of FIG. 33 is shown. The attenuator 290 includes an attenuator substrate 298 having a varying reflective coating 300. In one exemplary embodiment, the attenuator substrate 298 is formed of glass, and the attenuator coating 300 is a metallic coating, the thickness of which increases between first side 292 and second side 294.

The attenuator 290 is a unibody attenuator, and as such, does not require two separate crossed polarizers or lenses to attenuate a laser beam passing therethrough. Further, the variable density unibody attenuator 290 is a linear density wedge. As such, the optical density of the attenuator mechanism 290 increases proportionally with the distance across the attenuator 290.

Figure 35:
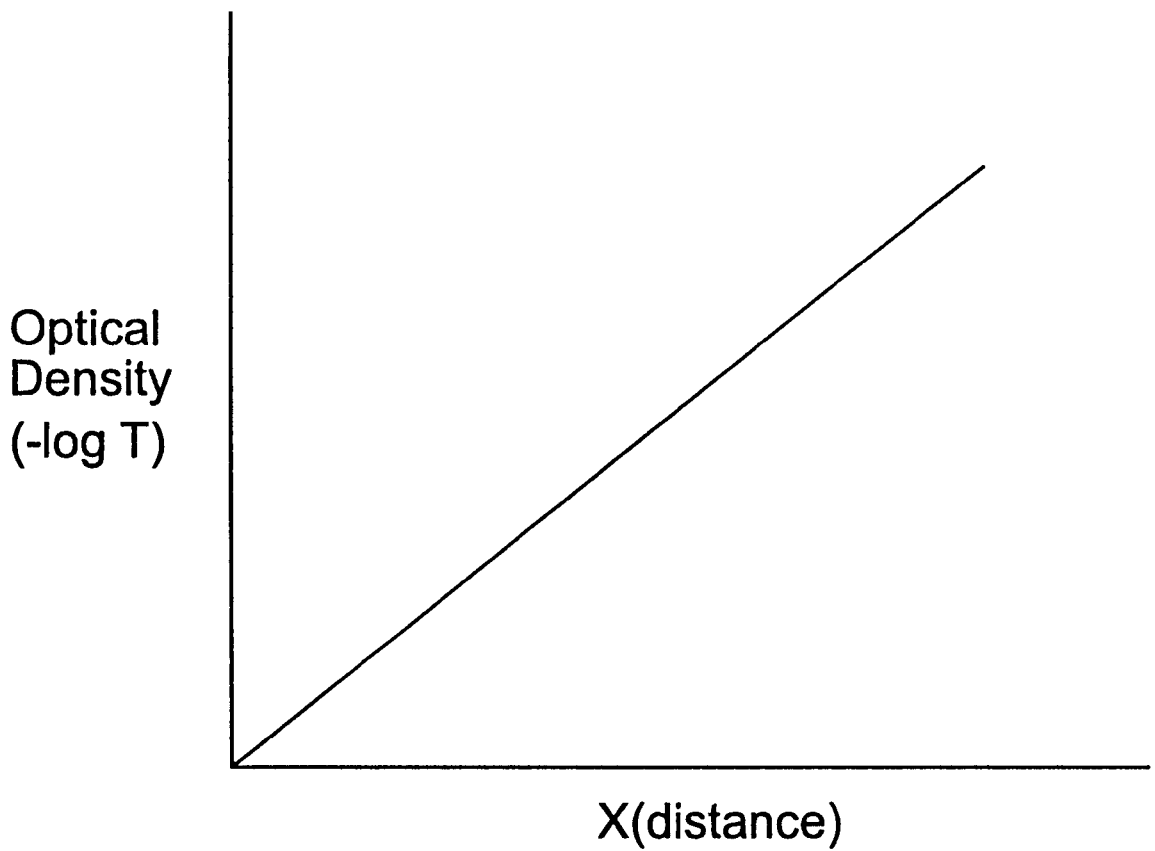
FIG. 35 is a graph of optical density versus distance for one exemplary embodiment of the attenuator shown in FIG. 33.

In operation, the attenuator top surface 302 is reflective (such as a mirror), not absorbing. As such, the farther one moves from first side 292 closer to second side 294, the more reflective (and less transmissive) attenuator 290 becomes. In FIG. 35, a graph showing the plot of the optical density of one embodiment of attenuator 290 versus the distance or position longitudinally along attenuator 290 (indicated by density gradient directional arrow 296) is shown. As shown, the optical density representative of the amount of attenuation increases proportionally the farther one moves along the attenuator 290 in direction 296 (termed "density gradient").

Figure 36:
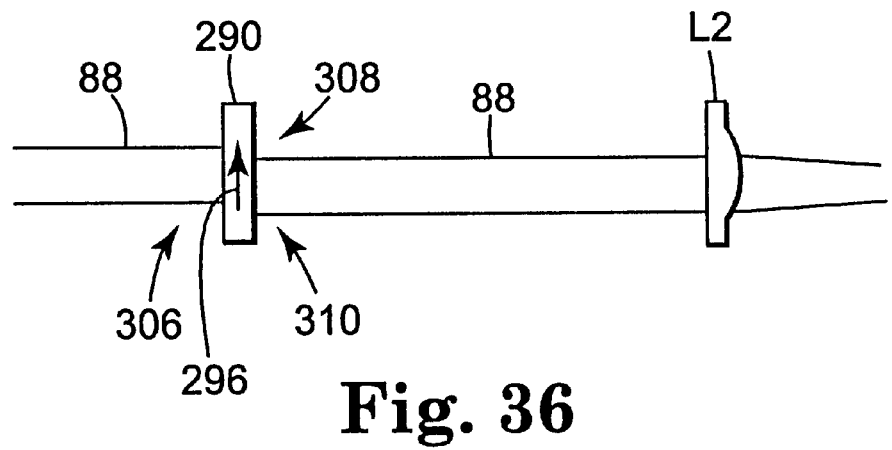
FIG. 36 is an optical diagram illustrating an exemplary embodiment of the effect of a laser beam passing through the attenuator in accordance with the present invention.

In FIG. 36, the effect of attenuator 290 on the position of laser beam 88 is shown (in the in-scan direction). The attenuator 290 density gradient is indicated by directional arrow 296. The attenuator density gradient is oriented perpendicular to the longitudinal axis of the second cylinder lens. As indicated at 310, the gaussian intensity profile of laser beam 88 is merely shifted by attenuator 290 as laser beam 88 passes through attenuator 290. It is recognized that since lens L2 is a plano-convex cylinder lens, the shifting of laser beam 88 by attenuator 290 does not effect the focusing of laser beam 88 onto the film 66. This unique optical configuration provides for the combination of a variable density attenuator 290 and L2 which results in no change in the focus spot at the photosensitive film positioned on the internal surface of the drum.

Figure 37:
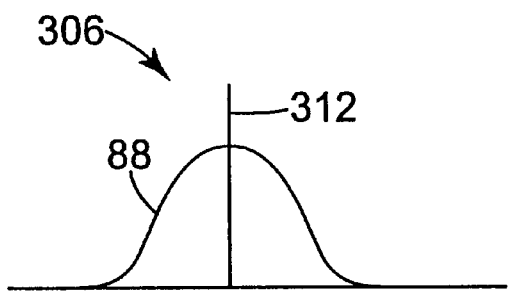
FIG. 37 is a graph illustrating an exemplary embodiment of the intensity of the laser beam relative to a center axis before it passes through the attenuator shown in FIG. 36.
Figure 38:
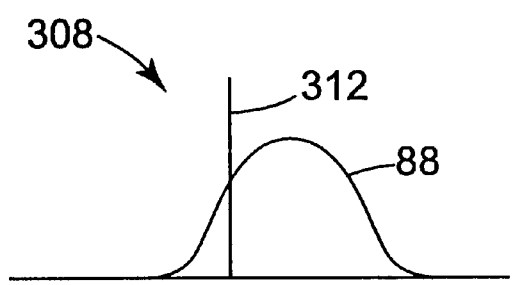
FIG. 38 is a graph illustrating an exemplary embodiment of the intensity of the laser beam relative to a center axis after it passes through the attenuator shown in FIG. 36.

In FIG. 37, a graphical representation of the laser beam 88 intensity and position on side 306 before passing through attenuator 290 is shown. As shown in FIG. 37, the laser beam 88 is centered about axis 312. In FIG. 38, laser beam 88 is shown at location 308 after passing through the attenuator 290. As such, it is noted that the shape of laser beam 88 has not changed, it has only shifted relative to central axis 312. In one exemplary embodiment of the optical scanner assembly in accordance with the present invention, the attenuator 290 shifts the laser beam 88 100 microns.

Figure 39:
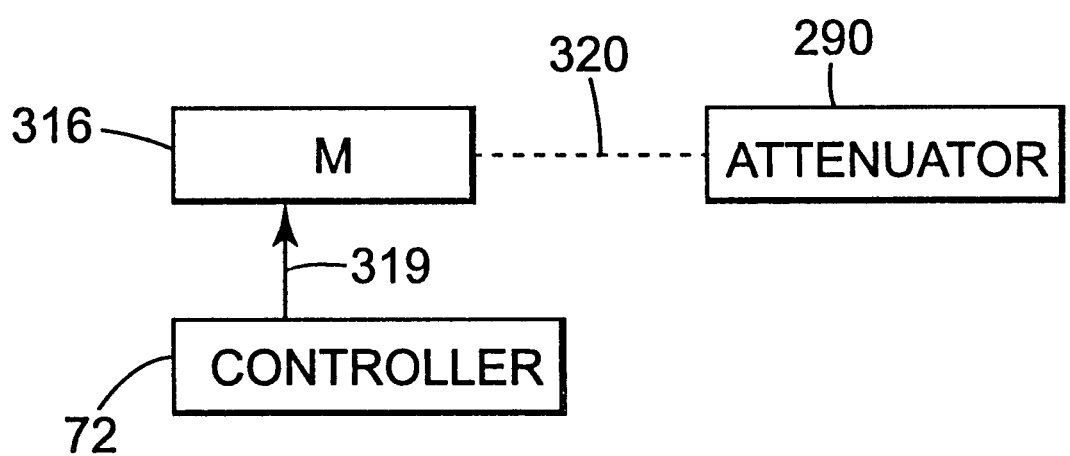
FIG. 39 is a block diagram illustrating one exemplary embodiment of a motor control system for calibration of an attenuator in accordance with the present invention.

In FIG. 39, one exemplary embodiment for calibration of laser beam 88 using attenuator 290 is shown. As shown in FIG. 39, the attenuator 290 is positioned for calibration of laser beam 88 during the manufacturing process of the optical scanner assembly 50. Calibration of the position of attenuator 290 is accomplished utilizing a motor 316 coupled to a controller 72. The motor 316 is electrically coupled to controller 72 (indicated at 319), and mechanically coupled to attenuator 290, indicated by mechanical connection 320. Motor 316 is responsive to controller 72 for moving attenuator 290 a desired distance. In one exemplary embodiment, the motor 316 is a screw motor which is mechanically coupled to the optical scanner assembly 50.

Figure 40:
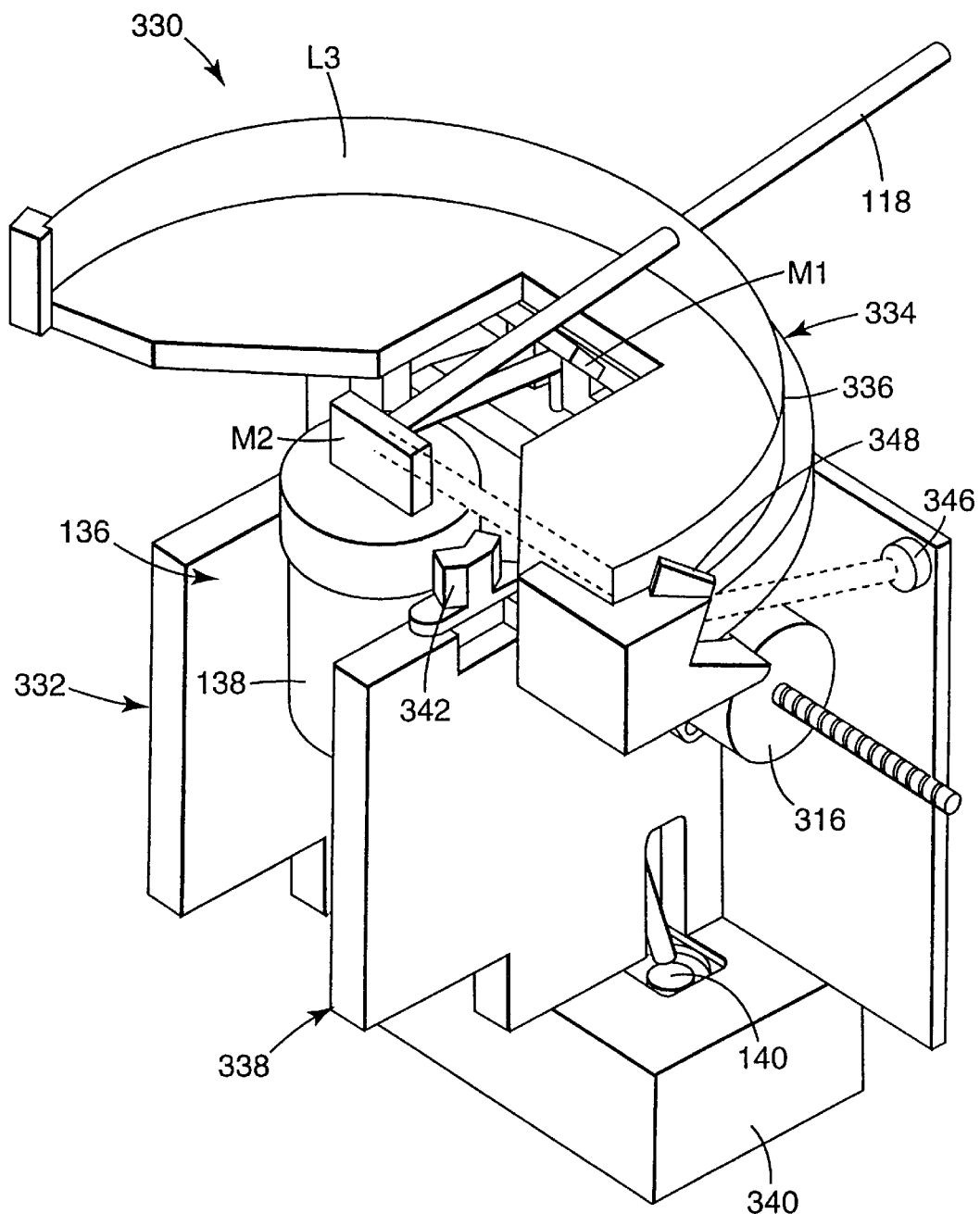
FIG. 40 is a first perspective view illustrating an exemplary embodiment of an optical scanner assembly for use in a laser imager in accordance with the present invention.

In FIG. 40, a perspective view illustrating one exemplary embodiment of an optical scanner assembly in accordance with the present invention is generally shown. The optical scanner assembly 330 can be similar to the optical scanner assembly 50 described previously herein, and includes laser beam shaping and directing system 100. In particular, the optical scanner assembly 330 includes laser beam shaping and directing system 100 contained within an optical scanner housing 332. The optical scanner housing may be positioned within the film exposure assembly 34 as part of a laser imaging process, and is mechanically coupled to the optics translation system 52.

The optical scanner housing 332 includes a flexible lens holder 334 having a guide 336, an optics module base 338 and a laser driver board enclosure 340. The scanner motor 138 is positioned within the optical module base 338. Flexible lens L3 is located within flexible lens holder 334. In particular, flexible lens L3 is inserted within lens guide 336, which imparts a desired curvature (such as the 180° arc shown) to the flexible lens L3. The laser driver 74 is located within the laser driver board enclosure 340. Additionally, a scanner speed sensor 342 and start-of-scan detector 346 are coupled to the optical scanner housing 332.

Figure 41:
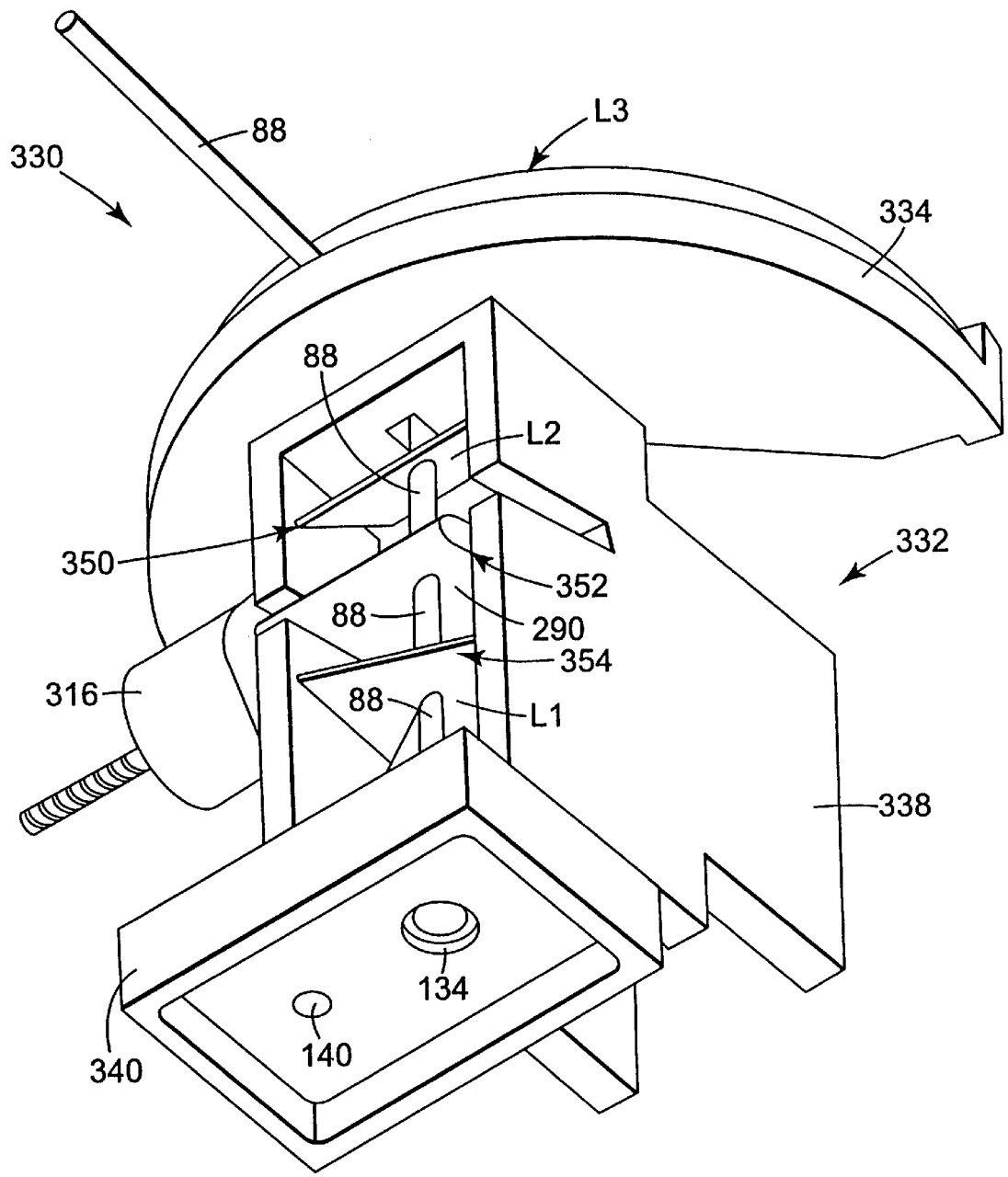
FIG. 41 is a rear perspective view illustrating the optical scanner assembly shown in FIG. 40.

In FIG. 41, another perspective view of the optical scanner 330 is shown. As shown in FIG. 41, the optical scanner housing 332 includes lens L2 holder 350, attenuator filter holder 352, and lens L1 holder 354. Accordingly, lens L2 is attached to optics module base 338 using lens L2 holder 350, attenuator 290 is attached to the optics module base 338 using attenuator filter holder 352, and lens L1 is attached to the optics module base 338 using lens L1 holder 354. Motor 316, as shown, is a linear actuator (e.g., screw motor) for adjusting the position of attenuator 352. The holders 350, 352 and 354 maintain lens L1, attenuator 290, and lens L2 in optical alignment along the optical path defined by laser beam 88 shown.

The optical scanner assembly in accordance with the present invention may be used in a laser imaging system which is suitable for use in medical imaging applications. Operation of such a system will be described in the following paragraphs. In reference to FIG. 1, the imaging system 30 can be a medical imaging system. Photosensitive film is stored within the film supply mechanism 32. The film transport system 40 allows the photosensitive film to be moved between the film exposure assembly 34, the film processing station 36, and the film receiving area 38. The film supply mechanism 32 feeds a piece of film along the film transport path 44 into the film exposure assembly 34 for exposing a desired image on the photosensitive film using the optical scanner assembly in accordance with the present invention. After exposure of the desired image on the photosensitive film, the photosensitive film is moved along the film transport path 44 to the film processing station 36. The film processing station 36 develops the image (through the application of heat) on the photosensitive film. After film development, the photosensitive film is cooled and transported to the film receiving area 38, where it may be picked up by the laser imager operator.

Figure 42:
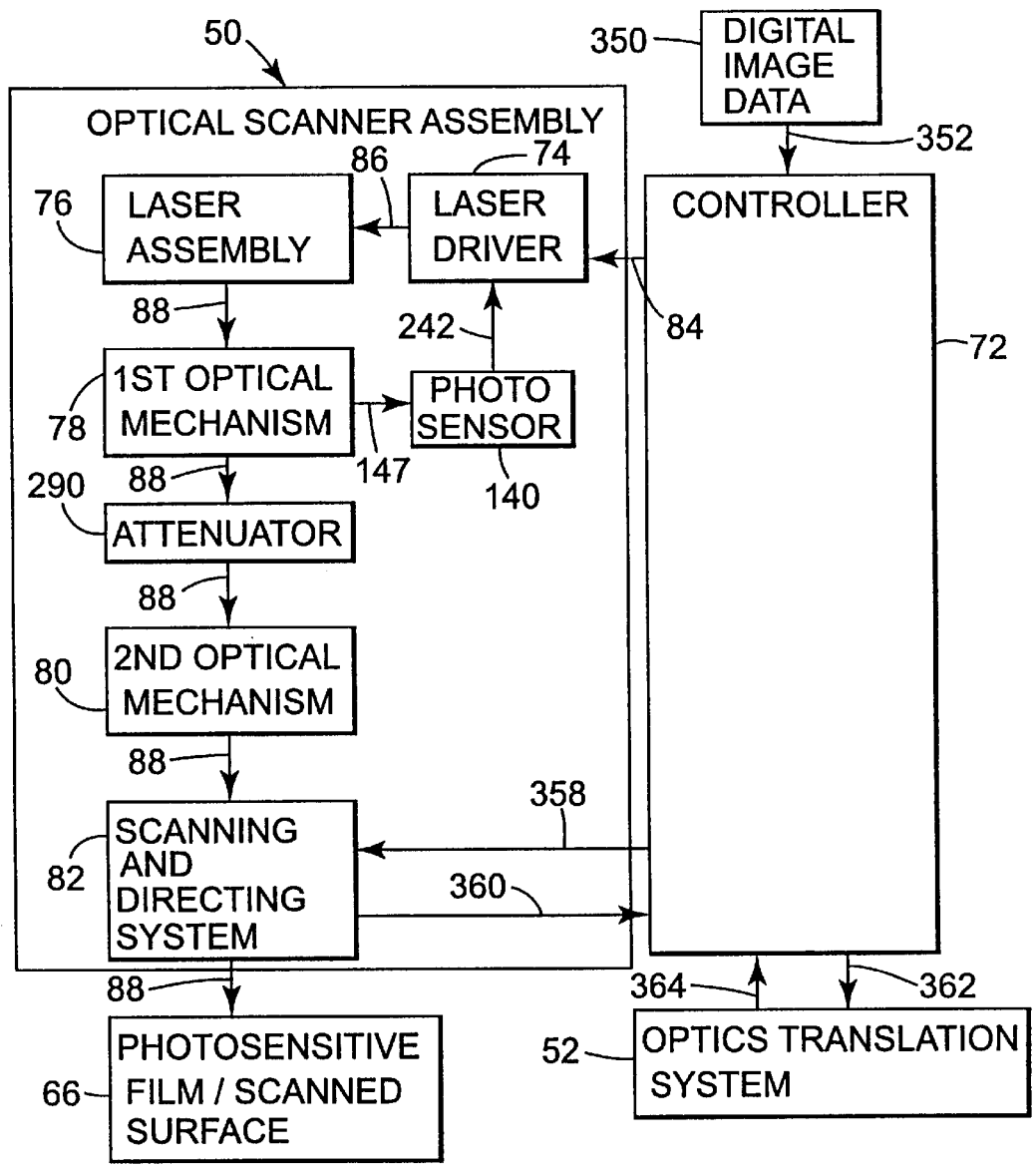
FIG. 42 is a block diagram illustrating one exemplary embodiment of operation of an optical scanner assembly in accordance with the present invention.

Referring to FIG. 42, a block diagram illustrating one exemplary embodiment of operation of an optical scanner assembly in accordance with the present invention, located within a film exposure module, is shown. Referring also to FIGS. 2 and 3, once a piece of photographic film 66 is positioned on the film platen 62, a desired image may be exposed on the film 66 using optical scanner assembly 50.

Digital image data 350 is input to controller 72, indicated at 352. The digital image data may be generated by magnetic resonance (MR), computed tomography (CT), or other types of scanners, as previously described herein. The digital image data is a sequence of digital image values representative of the image to be scanned. Upon receipt of the digital image data 350, controller 72 processes the digital image data to generate a sequence of digital laser drive values (i.e., exposure values), which are input to the laser driver 74, indicated as image signals 84. The digital laser drive values (image signals) 84 are representative of the image to be exposed on the photosensitive film 66, and as such, have been previously described herein as image signals 84.

Based on image signal 84 and a feedback signal 242 from photosensor 140, laser driver 74 provides a corresponding laser driver modulated output driver signal 86 to laser assembly 76 for producing laser beam 88 representative of the image to be exposed on the photographic film 66. Laser beam 88 passes through the optical scanner assembly laser beam shaping and directing system as previously described herein, which includes passing through first optical mechanism 78, attenuator 290, second optical mechanism 80, and scanning and directing system 82 for exposure of the desired image on the photosensitive film 66.

As previously described herein, first optical mechanism 78 (including lens L1 and flexible lens L3), and second optical mechanism 80 (including lens L2) function to shape the laser beam in two separate directions, which are perpendicular to each other. The first optical mechanism 78 functions to shape the laser beam 88 profile in a first direction (but not a second direction) for focusing the laser beam 88 in a first direction on the film 66, as previously described herein. Similarly, the second optical mechanism 80 functions to shape the laser beam 88 in the second direction (but not the first direction) for focusing the laser beam 88 in the second direction on the photosensitive film 66. Further, first optical mechanism 78 provides a feedback signal 147 to photo sensor 140. Photo sensor 140 provides a feedback signal 242 to laser driver 74, representative of the laser beam 88. Based on feedback signal 242 and image signal 84, laser driver 74 provides modulated signal 86 to laser assembly 76. Attenuator 290 functions to further shape laser beam 88, as described herein, for controlling and calibrating the power of laser beam 88 transmitted to the scanning and directing system 82.

Scanning and directing system 82 includes a scanner and mirror system for directing the laser beam 88 to the desired location on film 66 and scanning the laser beam 88 across the film 66 in a raster pattern for exposing the desired image on film 66. Controller 72 provides control signals 358 to scanning and directing system 82, and receives control signal 360, e.g., a start-of-scan signal, from detector 346 or speed signal from scanner speed sensor 342, from scanning and directing system 82. Similarly, optics translation system 52 receives control signals 362 from controller 72, and provides corresponding control signals 364 to controller 72. As previously described herein, within scanning and directing system 82, laser beam 88 is reflected by the folding mirror M1 such that it is incident on the scanner mirror M2. In one preferred embodiment, the scanner mirror M2 is a two-sided mirror which is mounted on the shaft through an adapter 137 of the scanner motor 138.

Upon operation of scanner motor 138, indicated by control signal 358, the scanner mirror M2 is rotated and the laser beam 88 is reflected outward radially, and transmitted through flexible lens L3 for exposing the film 66 in an image-wise raster pattern. Both sides of scanner mirror M2 are used for directing a laser beam 88 through flexible lens L3 to expose the film 66.

In one preferred embodiment, scanning and directing system 82 is a double scanning system. In particular, an image line is scanned twice with the same data on the photosensitive film 66. Double scanning has been found to improve image sharpness over single scanning, and makes scan line invisible under normal viewing conditions. The two scanned lines in an image line are scanned by the two sides of mirror M2 during one scanner rotation. This technique reduces banding due to scanner mirror pointing error. As the scanning and directing system 82 scans an image in a raster pattern on the photosensitive film 66, the optics translation system 52 moves the optical scanner assembly 50 along the longitudinal axis 56 of the drum 54, such that the entire image may be exposed on the film 66. In one preferred embodiment, the optics translation system cooperates with the optical scanner assembly 50 through controller 72 such that an image may be actively exposed on the film 66. As such, the optics translation system does not stop the optical scanner assembly 50 at the location of each scan line, and the optics translation system 52 is in a rest position during scanning of a scan line on the film 66 by the optical scanner assembly 50 (termed "continuous scanning operation" as known by those skilled in the art). The optics translation system 52 slowly moves the optical scanner assembly 50 in a uniform manner during scanning of the image scanned lines on the photosensitive film 66. In this embodiment, the image scan lines do not run perpendicular to the longitudinal axis of the drum 56, but rather results in an image formed by scan lines which are approximately perpendicular to the longitudinal axis 56 of the drum 54.

Upon completion of exposure of the desire image or images on film 66 by the optical scanner assembly 50, optical scanner assembly 50 is moved to a start position by optics translation system 52, ready for exposure of another image on another piece of film. The exposed photosensitive film 66 is transported from the exposure module 34 using film transport system 40 to the film processing station 36 for thermal processing of the photosensitive film as previously described herein.

Having described the exemplary embodiments of the invention, additional advantages and modifications will readily occur to those skilled in the art from consideration of the specification and practice of the invention disclosed herein. For example, the scanning assembly in accordance with the present invention may be used in other laser scanning application, such as film digitization. Therefore, the specification and examples should be considered exemplary only, with the true scope and spirit of the invention being indicated by the following claims.

What is claimed is:

1. An optical scanner assembly for exposing an image on a scanned surface, the optical scanner assembly comprising:
   a laser mechanism for producing a modulated laser beam representative of the image to be exposed on the scanned surface, the laser beam defining an optical path between the laser mechanism and the scanned surface;
   a laser beam shaping system positioned along said optical path for focusing and shaping the laser beam onto the scanned surface;
   a scanning and directing system positioned along said optical path for directing the laser beam to the scanned surface and scanning the laser beam across the scanned surface in an image-wise pattern;
   a single unibody variable density attenuation mechanism positioned along said optical path for power attenuation of the laser beam along a single polarization axis which is shifted laterally of said optical path, wherein the unibody attenuation mechanism is a linear density wedge; and
   an optical device for correcting said lateral shift of said laser beam.

2. The optical scanner assembly of claim 1, wherein the laser beam shaping system includes:
   a first cylinder lens positioned along the optical path for shaping and focusing the laser beam in a first direction; and
   a second cylinder lens having a longitudinal axis extending therethrough, positioned along the optical path for shaping and focusing the laser beam in a second direction;
   wherein the unibody attenuation mechanism has a density gradient which is oriented perpendicular to the longitudinal axis of the second cylinder lens.

3. The optical scanner assembly of claim 2, wherein the unibody attenuation mechanism is located between the laser mechanism and the second cylinder lens.

4. The optical scanner assembly of claim 2, wherein the second cylinder lens has a focusing spot at the scanned surface, and wherein the combination of the unibody attenuation mechanism and the second cylinder lens operate to maintain the size, shape and position of the focusing spot at the scanned surface.

5. The optical scanner assembly of claim 1, further wherein the unibody attenuation mechanism is movable along an axis perpendicular to said optical path.

6. The optical scanner assembly of claim 1, further comprising an adjustment mechanism coupled to the unibody attenuation mechanism for adjusting an amount of power attenuation of the laser beam.

7. The optical scanner assembly of claim 6, wherein the adjustment mechanism for adjusting the unibody attenuation mechanism adjusts a position of the unibody attenuation mechanism in a direction perpendicular to the optical path.

8. The optical scanner assembly of claim 6, wherein the adjustment mechanism for adjusting the unibody attenuation mechanism includes a linear actuator.

9. The optical scanner assembly of claim 1, wherein the unibody attenuation mechanism has a first end and a second end, wherein a degree of attenuation varies between the first end and the second end.

10. The optical scanner assembly of claim 9, wherein the unibody attenuation mechanism is positioned substantially perpendicular to the optical path having the laser beam passing therethrough, and wherein the attenuation of the laser beam power increases as the attenuation mechanism is moved from a position proximate the first end to a position proximate the second end.

11. The optical scanner assembly of claim 1, wherein the unibody attenuation mechanism includes a first side and a second side, and wherein the unibody attenuation mechanism shifts a position of the laser beam as it passes through the unibody attenuation mechanism from the first side to the second side.

12. The optical scanner assembly of claim 1, wherein the unibody attenuation mechanism further comprises:
    an attenuator support substrate having a major surface; and
    a varying reflective material covering the major surface.

13. The optical scanner assembly of claim 12, wherein the support substrate is constructed of glass.

14. The optical scanner assembly of claim 12, wherein the varying reflective material is a metallic material.

15. The optical scanner assembly of claim 12, wherein the attenuator support substrate includes a first end and a second end, and wherein a reflectivity density of the varying reflective material increases from the first end to the second end.

16. The optical scanner assembly of claim 12, wherein the unibody attenuation mechanism is partially transmissive, and wherein the attenuator support substrate includes a first end and a second end, and wherein the transmissive properties of the varying reflective material decrease from the first end to the second end.

17. An optical scanner assembly used in an internal drum type scanner, for exposing an image on a photosensitive film, the optical scanner assembly comprising:
    a laser mechanism for producing a modulated laser beam representative of the image to be exposed on the photosensitive film, the laser beam defining an optical path between the laser mechanism and the photosensitive film;
    a laser beam shaping system positioned along said optical path for focusing and shaping the laser beam;
    a scanning and directing system positioned along said optical path for directing the laser beam and scanning the laser beam radially across the photosensitive film in an image-wise pattern;
    a single variable density unibody attenuation mechanism having a first end and a second end, wherein a degree of density varies from the first end to the second end, and wherein the unibody attenuation mechanism is positioned along the optical path for power attenuation of the laser beam along a single polarization axis and for laterally shifting said laser beam relating to said optical path; and
    an optical device for correcting said lateral shift of said laser beam.

18. The optical scanner assembly of claim 17, further wherein the unibody attenuation mechanism is adjustable.

19. The optical scanner assembly claim 17, wherein an optical density of the unibody attenuation mechanism increases proportionally to a distance across the unibody attenuation mechanism between the first end and the second end.

20. The optical scanner assembly of claim 19, wherein the unibody attenuation mechanism is positioned substantially perpendicular to the optical path having the laser beam passing therethrough, and wherein the attenuation of the laser beam increases as the laser beam is moved from a position proximate the first end to a position proximate the second end.

21. The optical scanner assembly of claim 17, wherein the unibody attenuation mechanism includes a first side and a second side, and wherein the unibody attenuation mechanism shifts a position of the laser beam as it passes through the unibody mechanism from the first side to the second side.

22. The optical scanner assembly of claim 17, wherein the unibody attenuation mechanism further comprises:

an attenuator support substrate having a major surface; and a varying reflective material covering the major surface.

23. The optical scanner assembly of claim 22, wherein the support substrate is constructed of glass.

24. The optical scanner assembly of claim 22, wherein the varying reflective material is a metallic material.

25. The optical scanner assembly of claim 22, wherein the unibody attenuation mechanism is partially transmissive, and wherein the attenuator support substrate includes a first end and a second end, and wherein the transmissive properties of the varying reflective material decrease from the first end to the second end.

26. A laser imaging system comprising:

a film feed mechanism;

a film exposure mechanism;

a film processor mechanism;

a film receiving area; and a film transport system for moving a piece of photosensitive film between the film feed mechanism, the film exposure mechanism, the film processor mechanism, and the film receiving area;

wherein the film exposure mechanism includes an optical scanner assembly having a single unibody attenuation mechanism for power attenuation of a laser beam passing therethrough, wherein the single unibody attenuation mechanism is a linear density wedge.

27. The laser imaging system of claim 26, wherein the optical scanner assembly is an internal drum type scanner.

\* \* \* \* \*